(12) United States Patent
Unagami et al.

(10) Patent No.: US 11,973,882 B2
(45) Date of Patent: Apr. 30, 2024

(54) CONTROL METHOD, SERVER, AND RECORDING MEDIUM

(71) Applicant: Panasonic Intellectual Property Corporation of America, Torrance, CA (US)

(72) Inventors: Yuji Unagami, Osaka (JP); Junji Michiyama, Fukuoka (JP); Junichiro Soeda, Nara (JP); Naohisa Nishida, Osaka (JP); Yuuki Hirose, Osaka (JP); Tetsuji Fuchikami, Osaka (JP); Motoji Ohmori, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 319 days.

(21) Appl. No.: 17/582,400

(22) Filed: Jan. 24, 2022

(65) Prior Publication Data

US 2022/0150074 A1 May 12, 2022

Related U.S. Application Data

(63) Continuation of application No. PCT/JP2020/028945, filed on Jul. 28, 2020.
(Continued)

(51) Int. Cl.
  *G06F 21/00* (2013.01)
  *G06Q 20/38* (2012.01)
  *H04L 9/32* (2006.01)

(52) U.S. Cl.
  CPC ......... *H04L 9/3247* (2013.01); *G06Q 20/389* (2013.01)

(58) Field of Classification Search
  CPC ....... H04L 9/3247; H04L 9/3297; H04L 9/50; G06Q 20/389; G06Q 20/3825;
  (Continued)

(56) References Cited

U.S. PATENT DOCUMENTS 10,848,315 B2 * 11/2020 Watanabe ............... G06F 21/64
2002/0062293 A1    5/2002 Yagi et al.
(Continued)

FOREIGN PATENT DOCUMENTS

JP    2002-159138    5/2002

OTHER PUBLICATIONS

International Search Report (ISR) dated Oct. 27, 2020 in International (PCT) Application No. PCT/JP2020/028945.

*Primary Examiner* — Brandon Hoffman
*Assistant Examiner* — William A Corum, Jr.
(74) *Attorney, Agent, or Firm* — Wenderoth, Lind & Ponack, L.L.P.

(57) ABSTRACT

A control method includes: receiving first information pertaining to a first contract from a first terminal used by a first user who is one of two parties who have agreed to the first contract; when consent of a party aside from the two parties is required to validate the first contract, identifying a second user as the party aside from the two parties with reference to a ledger storing information pertaining to a past contract, and transmitting the first information to a second terminal operated by the second user; obtaining second information in which a confirmation result indicating whether the second user consents to the first contract and a digital signature of the second user are added to the first information; and confirming the second information, and when the confirmation result indicates consent, setting the first contract as a valid contract and storing the second information in the ledger.

10 Claims, 30 Drawing Sheets

Related U.S. Application Data

(60) Provisional application No. 62/881,567, filed on Aug. 1, 2019.

(58) Field of Classification Search
CPC ...... G06Q 20/405; G06Q 50/10; G06Q 10/10; G06F 21/64
See application file for complete search history.

(56) References Cited

U.S. PATENT DOCUMENTS

| | | | |
|---|---|---|---|
| 2019/0188411 A1* | 6/2019 | Kroutik | H04L 9/3297 |
| 2020/0160290 A1* | 5/2020 | Peikert | G06Q 20/382 |
| 2021/0174972 A1* | 6/2021 | Pavlatos | G16H 10/60 |

* cited by examiner

CONTROL METHOD, SERVER, AND RECORDING MEDIUM

CROSS REFERENCE TO RELATED APPLICATIONS

This is a continuation application of PCT International Application No. PCT/JP2020/028945 filed on Jul. 28, 2020, designating the United States of America, which is based on and claims priority of U.S. Provisional Patent Application No. 62/881,567 filed on Aug. 1, 2019. The entire disclosures of the above-identified applications, including the specifications, drawings and claims are incorporated herein by reference in their entirety.

FIELD

The present disclosure relates to a control method, a server, and a recording medium.

BACKGROUND

For example, PTL 1 discloses a method in which a necessary maximum current capacity used by each of users is found and a contracted current is determined according to the maximum current capacity found.

CITATION LIST

Patent Literature

PTL 1: Japanese Unexamined Patent Application Publication No. 2002-159138

SUMMARY

Technical Problem

However, in the method disclosed in PTL 1, each user enters into an individual contract with a business operator such as an electric power company, and there is thus a problem in that it is not possible to suppress situations where the business operator and a user collude to enter into a contract with contract content that is not fair to other users.

For example, in a housing complex such as an apartment building, a user in each unit and the electric power company enter into individual contracts. In this case, the electric power company and one user may collude and enter into a contract with preferential contract content compared to other users, such as having the amount of power allocated to only the user's residence increased, the fee per kilowatt reduced, or the like. Here, even if the contract content for each unit in a housing complex are managed so as to be visible to the entire housing complex, it is not possible to guarantee that users of each unit will actively go to view the contract terms of other users to confirm that the contracts are fair. In other words, when a business operator and users enter into individual contracts, it is not possible to suppress situations where the electric power company and one user collude to create preferential contract content.

Additionally, for example, in a car sharing service including automobiles, each user and the service provider business enter into an individual contract. In this case too, the service provider business and a user may collude to enter into a contract with preferential contract content compared to other users, such as increasing the share time of the user while charging that user the same fee as the other users. As above, in such a case, even if the contract content for each user is managed so as to be visible to all the users, it is not possible to guarantee that users will actively go to view the contract content of other users to confirm that the contracts are fair. In other words, when a service provider business and users enter into individual contracts, it is not possible to suppress situations where the service provider business and one user collude to create preferential contract content.

Having been achieved in light of the foregoing situation, an object of the present disclosure is to provide a control method, a server, and a recording medium that enable newly-formed contracts to be audited more reliably.

Solution to Problem

A control method according to one aspect of the present disclosure is a control method executed by a first server among at least one server in a system, the system including at least three terminals used by corresponding users and the at least one server. The control method includes: receiving first information pertaining to a first contract from a first terminal used by a first user among the at least three terminals, the first user being one of two parties who have agreed to the first contract; when consent of a party aside from the two parties is determined to be required to validate the first contract, identifying a second user as the party aside from the two parties with reference to a ledger storing information pertaining to a past contract, and transmitting the first information to a second terminal among the at least three terminals operated by the second user identified; obtaining second information in which a confirmation result indicating whether the second user consents or does not consent to the first contract and a digital signature of the second user are added to the first information; and confirming the second information, and when the confirmation result indicates consent to the first contract, setting the first contract as a valid contract and storing the second information in which the first contract is set as a valid contract in the ledger.

Note that these comprehensive or specific aspects may be realized by a system, a method, an integrated circuit, a computer program, or a computer-readable recording medium such as a CD-ROM, or may be implemented by any desired combination of systems, methods, integrated circuits, computer programs, and recording media.

Advantageous Effects

According to the present disclosure, newly-formed contracts can be audited more reliably.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
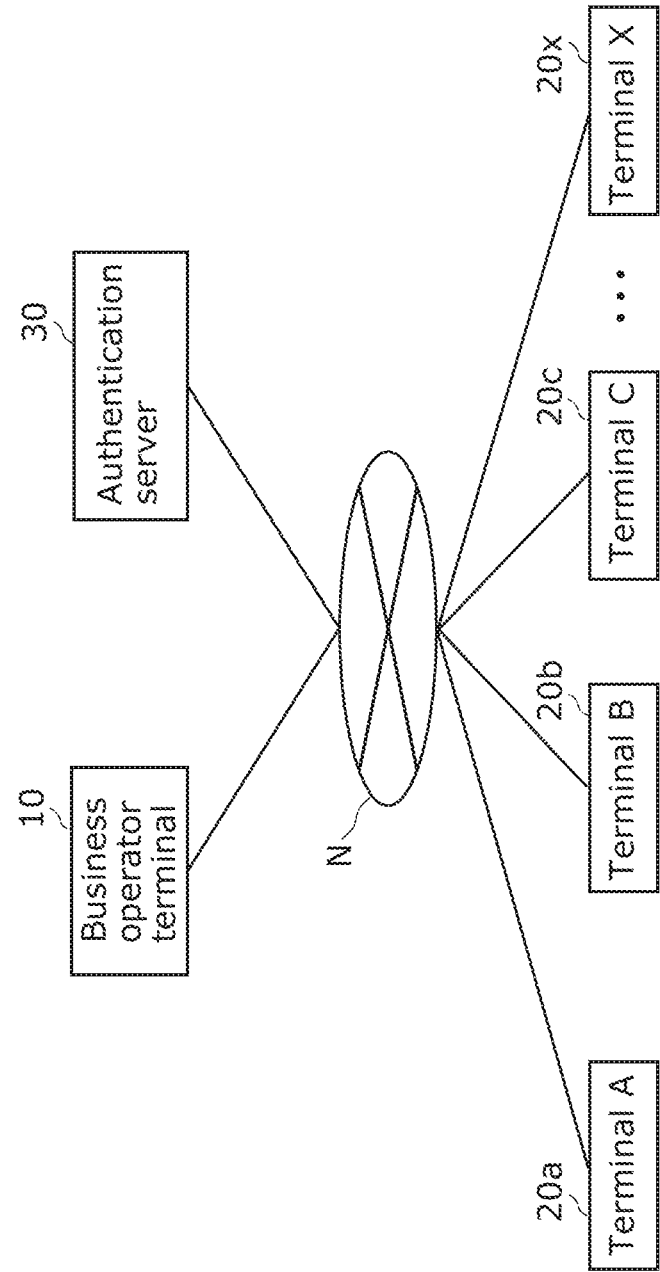
FIG. 1 is a diagram illustrating an example of the configuration of a management system according to Embodiment 1.

A control method according to one aspect of the present disclosure is a control method executed by a first server among at least one server in a system, the system including at least three terminals used by corresponding users and the at least one server. The control method includes: receiving first information pertaining to a first contract from a first terminal used by a first user among the at least three terminals, the first user being one of two parties who have agreed to the first contract; when consent of a party aside from the two parties is determined to be required to validate the first contract, identifying a second user as the party aside from the two parties with reference to a ledger storing information pertaining to a past contract, and transmitting the first information to a second terminal among the at least three terminals operated by the second user identified; obtaining second information in which a confirmation result indicating whether the second user consents or does not consent to the first contract and a digital signature of the second user are added to the first information; and confirming the second information, and when the confirmation result indicates consent to the first contract, setting the first contract as a valid contract and storing the second information in which the first contract is set as a valid contract in the ledger.

Through this, a newly-formed contract can be reliably audited.

Additionally, for example, when identifying the second user, a party who is another of two parties who have agreed to a second contract agreed to and validated earlier in time than the first contract, and is a party different from the first user, may be identified as the second user.

Through this, a newly-formed contract can be audited by an existing contractor who entered into the contract earlier in time than the stated contract.

Additionally, for example, when setting the first contract as a valid contract, a flag indicating that the first contract is a valid contract may be included in the second information.

Additionally, for example, the ledger may be a distributed ledger in which a plurality of ledgers having identical content are built on blockchain infrastructure.

Through this, the contract which has been audited and validated is stored in the distributed ledger, which makes it possible to prevent a newly-formed contract from being tampered with at a later date. Accordingly, situations where the business operator and the user collude on a contract having favorable contract content can be suppressed more reliably.

Additionally, for example, when obtaining the second information, the second information may be obtained by receiving transaction data including the second information, and when storing the second information, in which the first contract is set as a valid contract, in the ledger, a block including the transaction data may be stored in the distributed ledger.

Additionally, for example, when storing a block including the transaction data in the ledger, a consensus algorithm for agreeing on a validity of the transaction data may be executed along with a plurality of second servers aside from the first server among the at least one server, and a block including the transaction data may be stored in the distributed ledger when the validity of the transaction data has been agreed on through the consensus algorithm.

Additionally, for example, each of the at least three terminals may have the ledger, and when storing a block including the transaction data in the ledger, a consensus algorithm for agreeing on a validity of the transaction data may be executed along with the at least three terminals, and a block including the transaction data may be stored in the ledger when the validity of the transaction data has been agreed on through the consensus algorithm.

Additionally, for example, when storing a block including the transaction data in the ledger, the transaction data may be stored in the ledger as blockchain transaction data.

Additionally, for example, the first information may include: data indicating contract content of the first contract; an identifier (ID) indicating a third user, the third user being another of the two parties who have agreed to the first contract; and an ID indicating a generator of the first information.

A server according to one aspect of the present disclosure is a server among at least one server in a system, the system including at least three terminals used by corresponding users and the at least one server. The server includes a processor and memory. The processor receives first information pertaining to a first contract from a first terminal used by a first user among the at least three terminals, the first user being one of two parties who have agreed to the first contract. When consent of a party aside from the two parties is determined to be required to validate the first contract, the processor identifies a second user as the party aside from the two parties with reference to a ledger storing information pertaining to a past contract, and transmits the first information to a second terminal among the at least three terminals operated by the second user identified. The processor obtains second information in which a confirmation result indicating whether the second user consents or does not consent to the first contract and a digital signature of the second user are added to the first information. The processor confirms the second information, and when the confirmation result indicates consent to the first contract, sets the first contract as a valid contract and stores the second information in which the first contract is set as a valid contract in the ledger.

A recording medium according to one aspect of the present disclosure is a non-transitory computer-readable recording medium having recorded thereon a computer program for causing a computer to execute a control method executed by a first server among at least one server in a system, the system including at least three terminals used by corresponding users and the at least one server. The control method includes: receiving first information pertaining to a first contract from a first terminal used by a first user among the at least three terminals, the first user being one of two parties who have agreed to the first contract; when consent of a party aside from the two parties is determined to be required to validate the first contract, identifying a second user as the party aside from the two parties with reference to a ledger storing information pertaining to a past contract, and transmitting the first information to a second terminal among the at least three terminals operated by the second user identified; obtaining second information in which a confirmation result indicating whether the second user consents or does not consent to the first contract and a digital signature of the second user are added to the first information; and confirming the second information, and when the confirmation result indicates consent to the first contract, setting the first contract as a valid contract and storing the second information in which the first contract is set as a valid contract in the ledger.

Embodiments will be described hereinafter with reference to the drawings. Note that the following embodiments describe specific examples of the present disclosure. In other words, the numerical values, shapes, materials, constituent elements, arrangements and connection states of constituent elements, steps, orders of steps, and the like in the following embodiments are merely examples, and are not intended to limit the present disclosure. Additionally, of the constituent elements in the following embodiments, constituent elements not denoted in the independent claims indicating the broadest interpretation are not absolutely necessary for solving the problem of the present disclosure, and will instead be described as constituent elements constituting more preferred forms.

Embodiment 1

The configuration of a system according to the present disclosure will be described first.

A management system according to the present disclosure includes three or more terminals, each used by a user, and one or more authentication servers. The management system causes a contract document, i.e., the contract content, of a newly-formed contract to be audited, and based on an audit result, stores the validated contract in a ledger. The configuration and the like of the management system according to the present embodiment will be described hereinafter with reference to the drawings.

Management System

FIG. 1 is a diagram illustrating an example of the configuration of the management system according to Embodiment 1.

As illustrated in FIG. 1, the management system according to the present embodiment includes, for example, business operator terminal 10, terminals 20a to 20x, and authentication server 30. These are connected over network N. Network N is, for example, the Internet, a cellular telephone carrier network, or the like, but may be constituted by any communication line or network. Note that although each of terminal 20a to terminal 20x will also be called "terminal 20" hereinafter, terminal 20a to terminal 20x may also be referred to as "terminal A" to "terminal X".

Business operator terminal 10 will be described hereinafter.

Business Operator Terminal 10

Business operator terminal 10 is an example of a terminal used by a user, and is a first terminal used by a first user who is one of two parties who have agreed to a first contract.

In the present embodiment, business operator terminal 10 is a terminal used by a business operator, who is one user. Business operator terminal 10 may be a personal computer, for example, or may be a mobile terminal such as a smartphone, a tablet, or the like. Note that the business operator may be, for example, a person who runs a business such as a power company, a sharing service provider, or the like, or may be an employee of the same. The first contract is, for example, one of individual contracts.

Figure 2:
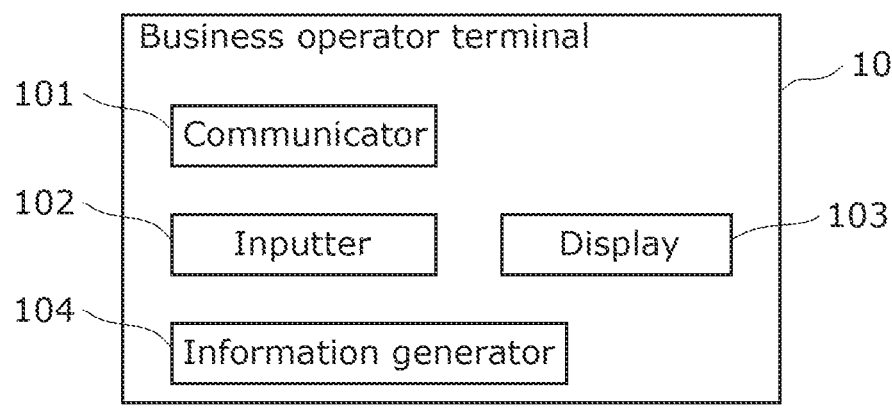
FIG. 2 is a diagram illustrating an example of the configuration of a business operator terminal according to Embodiment 1.

FIG. 2 is a diagram illustrating an example of the configuration of business operator terminal 10 according to Embodiment 1.

Business operator terminal 10 according to the present embodiment includes communicator 101, inputter 102, display 103, and information generator 104.

Communicator 101

Communicator 101 transmits, to authentication server 30, second information, in which a confirmation result indicating whether a second user consents or does not consent to the first contract and a digital signature of the second user is added to first information.

In the present embodiment, communicator 101 transmits information to authentication server 30, receives notifications from authentication server 30, and the like over network N. Communicator 101 also transmits information to terminal 20, receives information from terminal 20, and the like over network N.

In this manner, communicator 101 communicates with terminals 20a to 20x or authentication server 30 over network N. Note that this communication may be performed using Transport Layer Security (TLS), and communicator 101 may hold an encryption key for TLS communication.

Inputter 102

Inputter 102 accepts information input through operations made by the business operator. Inputter 102 displays the accepted information input in display 103, transmits the accepted information input to information generator 104 or communicator 101, and the like.

In the present embodiment, inputter 102 accepts items pertaining to contract document X1 agreed upon with user X and a digital signature of the business operator, which are input through operations made by the business operator. Contract document X1 is an example of the first contract and is data including the contract content of the first contract. Inputter 102 transmits, to information generator 104, the items and the digital signature of the business operator which have been accepted. Additionally, inputter 102 accepts confirmation of a notification displayed in display 103, through operations made by the business operator.

Display 103

Display 103 displays the information input accepted by inputter 102. Display 103 displays information communicated from authentication server 30.

Information Generator 104

Information generator 104 generates the first information pertaining to the first contract.

In the present embodiment, based on the items pertaining to contract document X1 agreed upon with user X and the digital signature of the business operator, which are accepted by inputter 102, information generator 104 generates information X1 pertaining to contract document X1. User X is the other of the two parties who have agreed to the first contract, and is, for example, an example of a third user.

Here, information X1 includes the data of contract document X1, time information, a contractor ID, and a digital signature of the generator of information X1. Information X1 may further include a serial number for ascertaining the order in which the first contract was entered into. The data of contract document X1 is data indicating the contract content of the first contract, and may be data in which the contract content of contract document X1 is encrypted, or a hash value for identifying the contract content of contract document X1. The time information may indicate the time at which information X1 was generated, or may indicate the time at which the first contract was entered into. Additionally, the time information may indicate the time at which information X1 was transmitted to authentication server 30 by communicator 101. The generator of information X1 here is the first user, i.e., the business operator. The contractor ID is the ID of the third user, i.e., user X, who is the other of the two parties have agreed to the first contract.

Terminal 20a to terminal 20x will be described next. Note that terminal 20a to terminal 20x have the same configuration, and will therefore be referred to as "terminal 20".

Terminal 20

Terminal 20 is an example of a terminal used by a user. Terminal 20 may be a personal computer, for example, or may be a mobile terminal such as a smartphone, a tablet, or the like. One of terminals 20 is a terminal used by the third user, who is the other of the two parties who have agreed to the first contract. Additionally, one of terminals 20 is a terminal used by the second user, who is a party aside from the two parties who have agreed to the first contract.

In the present embodiment, it is assumed that of the plurality of terminals 20, terminal 20a, i.e., terminal A, is a terminal used by the second user, who is a party aside from the two parties who have agreed to the first contract. Note that the second user is, for example, the other of two parties who have agreed to a second contract agreed to and validated earlier in time than the first contract and is a party different from the first user, and is an example of an existing contractor.

Additionally, it is assumed that of the plurality of terminals 20, terminal 20x, i.e., terminal X, is a terminal used by the third user, who is the other of the two parties who have agreed to the first contract.

Figure 3:
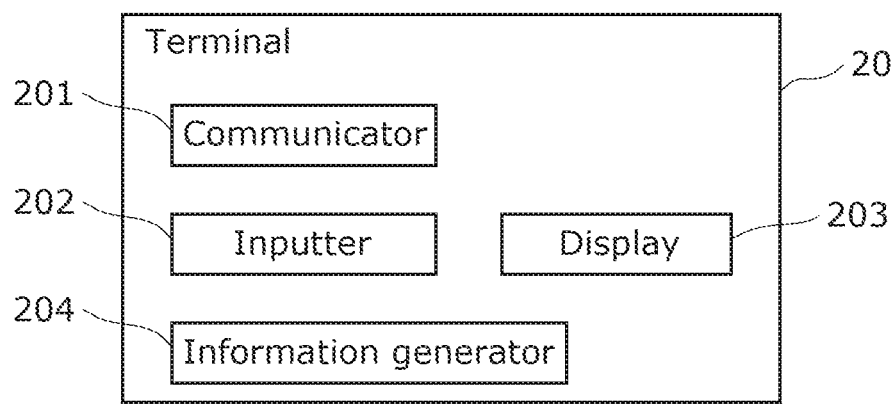
FIG. 3 is a diagram illustrating an example of the configuration of a terminal according to Embodiment 1.

FIG. 3 is a diagram illustrating an example of the configuration of terminal 20 according to Embodiment 1.

Terminal 20 according to the present embodiment includes communicator 201, inputter 202, display 203, and information generator 204.

Communicator 201

Communicator 201 transmits information to authentication server 30, receives information or notifications from authentication server 30, and the like over network N. Communicator 201 also transmits information to business operator terminal 10 or another terminal 20, receives information from business operator terminal 10 or another terminal 20, and the like over network N.

In this manner, communicator 201 communicates with business operator terminal 10, another terminal 20, or authentication server 30 over network N. Note that this communication may be performed using TLS, and communicator 201 may hold an encryption key for TLS communication.

For example, when terminal 20 is terminal A, communicator 201 receives the first information from authentication server 30. Communicator 201 transmits, to business operator terminal 10, the second information, in which a confirmation result indicating whether the second user consents or does not consent to the first contract and the digital signature of the second user is added to the first information.

Inputter 202

Inputter 202 accepts information input through operations made by the user. Inputter 202 displays the accepted information input in display 203, transmits the accepted information input to information generator 204 or communicator 201, and the like.

For example, when terminal 20 is terminal A, inputter 202 accepts the confirmation result indicating consent or nonconsent to contract document X1, i.e., the contract content of contract document X1, and the digital signature of the second user, input through operations made by the second user. Inputter 202 transmits, to information generator 204, the confirmation result and the digital signature which have been accepted.

Display 203

Display 203 displays the information input accepted by inputter 202. Display 203 displays information transmitted from authentication server 30.

For example, when terminal 20 is terminal A, display 203 displays the first information transmitted from authentication server 30.

Information Generator 204

Information generator 204 generates the second information pertaining to the first contract, in which a confirmation result indicating whether the second user consents or does not consent to the first contract and the digital signature of the second user is added to the first information.

In the present embodiment, information generator 204 generates information X2, in which the confirmation result indicating whether the second user, who is the existing contractor, consents to (the contract content of) contract document X1 accepted by inputter 202 and the digital signature of the second user are added to information X1. Information X2 is an example of the second information.

Authentication server 30 will be described next.

Authentication Server 30

Authentication server 30 is an example of a first server.

Figure 4:
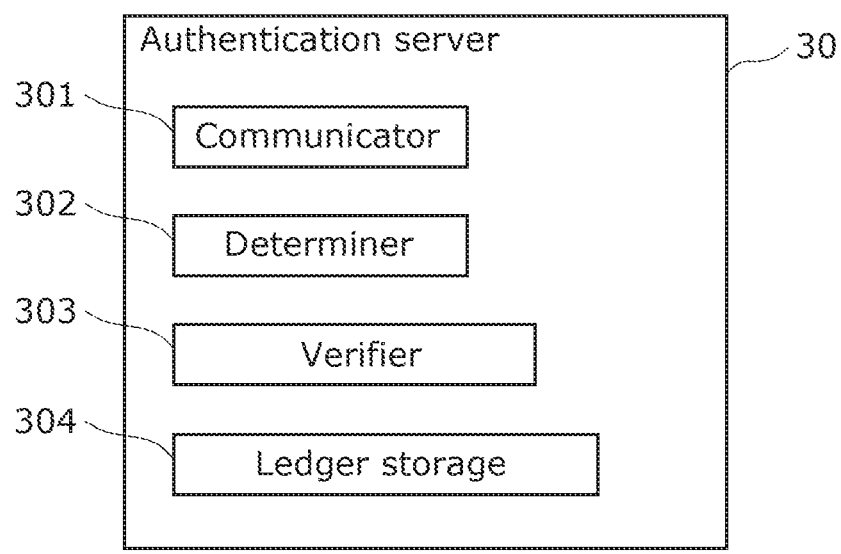
FIG. 4 is a diagram illustrating an example of the configuration of an authentication server according to Embodiment 1.

FIG. 4 is a diagram illustrating an example of the configuration of authentication server 30 according to Embodiment 1.

As illustrated in FIG. 4, authentication server 30 includes communicator 301, determiner 302, verifier 303, and ledger storage 304. Authentication server 30 can be implemented by a processor executing a predetermined program using memory. Each constituent element will be described hereinafter.

Communicator 301

Communicator 301 receives the first information pertaining to the first contract from the first terminal used by the first user, who is one of the two parties who have agreed to the first contract. Communicator 301 transmits the first information to a second terminal used by the second user identified by determiner 302.

Additionally, communicator 301 obtains the second information, in which the confirmation result indicating whether the second user consents or does not consent to the first contract and the digital signature of the second user is added to the first information.

In the present embodiment, communicator 301 notifies business operator terminal 10 over network N that the existing contractor does not consent to contract document X1 or that contract document X1 is valid, transmits information X1 to terminal A among terminals 20, and the like. Additionally, communicator 301 receives information X1 from business operator terminal 10, receives information X2 from terminal A among terminals 20, and the like.

In this manner, communicator 301 communicates with business operator terminal 10 or terminal 20 over network N. Note that this communication may be performed using TLS, and communicator 301 may hold an encryption key for TLS communication.

Determiner 302

When communicator 301 has received the first information pertaining to the first contract, determiner 302 determines whether or not consent from a party aside from the two parties who agreed to the first contract is required to validate the first contract. If it is determined that consent from a party aside from the two parties is required to validate the first contract, determiner 302 refers to a ledger storing information pertaining to past active contracts and identifies the second user as the party aside from the two parties.

In the present embodiment, when communicator 301 has received information X1 pertaining to contract document X1, determiner 302 determines whether or not information X1 requires the consent of the existing contractor, i.e., an audit by the existing contractor, in order to validate contract document X1.

If it is determined that an audit by the existing contractor is required in order to validate contract document X1, determiner 302 identifies the second user, who is an existing contractor who entered into a contract earlier in time than the agreement to contract document X1. Determiner 302 causes terminal A of the second user, who is the existing contractor identified, to transmit information X1 via communicator 301.

Note that when determiner 302 determines that an audit by the existing contractor is required to validate contract document X1, business operator terminal 10 is notified that contract document X1 in information X1 is valid by communicator 301. In this manner, if there is an existing contractor who entered into the contract earlier in time than the agreement with contract document X1, determiner 302 determines that an audit by the existing contractor is required.

A method for determining whether or not information X1 requires an audit by the existing contractor will be described here.

For example, whether or not there is a contract that was entered into before information X1 can be seen if information X1 includes a serial number. Accordingly, if information X1 includes a serial number, determiner 302 may determine whether or not information X1 requires an audit by the existing contractor based on the serial number.

Additionally, whether or not there is a contract that was entered into before information X1 can be seen by using the time information included in information X1. Accordingly, determiner 302 may determine whether or not information X1 requires an audit by the existing contractor based on the time information included in information X1.

Verifier 303

When communicator 301 receives the second information pertaining to the first contract, verifier 303 verifies the second information. More specifically, verifier 303 confirms the second information received by communicator 301, and if the confirmation result included in the second information indicates consent to the first contract, the first contract is set as a valid contract. Here, verifier 303 may set the first contract as a valid contract by including a flag indicating that the first contract is a valid contract in the second information.

Verifier 303 stores the second information, in which the first contract is set as a valid contract, in the ledger.

In the present embodiment, verifier 303 confirms information X2 received by communicator 301, and when the confirmation result included in information X2 indicates consent to the contract content of contract document X1, sets contract document X1 to a valid contract by including the flag indicating that the contract is valid in information X2.

Verifier 303 stores information X2, in which the first contract is set as a valid contract, in the ledger of ledger storage 304. Verifier 303 then notifies business operator terminal 10 that contract document X1 is valid via communicator 301.

Note that verifier 303 may store information X2 in the ledger before setting the first contract as a valid contract, and then set contract document X1 as a valid contract by including a flag indicating that the contract is valid when the confirmation result included in information X2 indicates consent to the first contract. In this case, information X2 may be deleted from the ledger in ledger storage 304 if the confirmation result included in information X2 indicates non-consent to the first contract. Verifier 303 then notifies business operator terminal 10 that the existing contractor does not consent to contract document X1, i.e., that contract document X1 is not valid, via communicator 301.

Additionally, if determiner 302 has determined that an audit by the existing contractor is not required to validate contract document X1, verifier 303 sets contract document X1 to a valid contract by including a flag indicating that the contract is valid in information X1. Note that verifier 303 may store information X1 in the ledger before setting the first contract as a valid contract, and then set contract document X1 as a valid contract by including a flag indicating that the contract is valid.

Ledger Storage 304

Ledger storage 304 stores a ledger in which information of past valid contracts is stored. In the present embodiment, contract document X1 of the first contract that has been validated is stored in the ledger of ledger storage 304 by verifier 303 storing information X2 or information X1 including the flag indicating that the contract is valid.

Operations, Etc. of Management System

Operations of the management system configured as described above will be described next.

Figure 5:
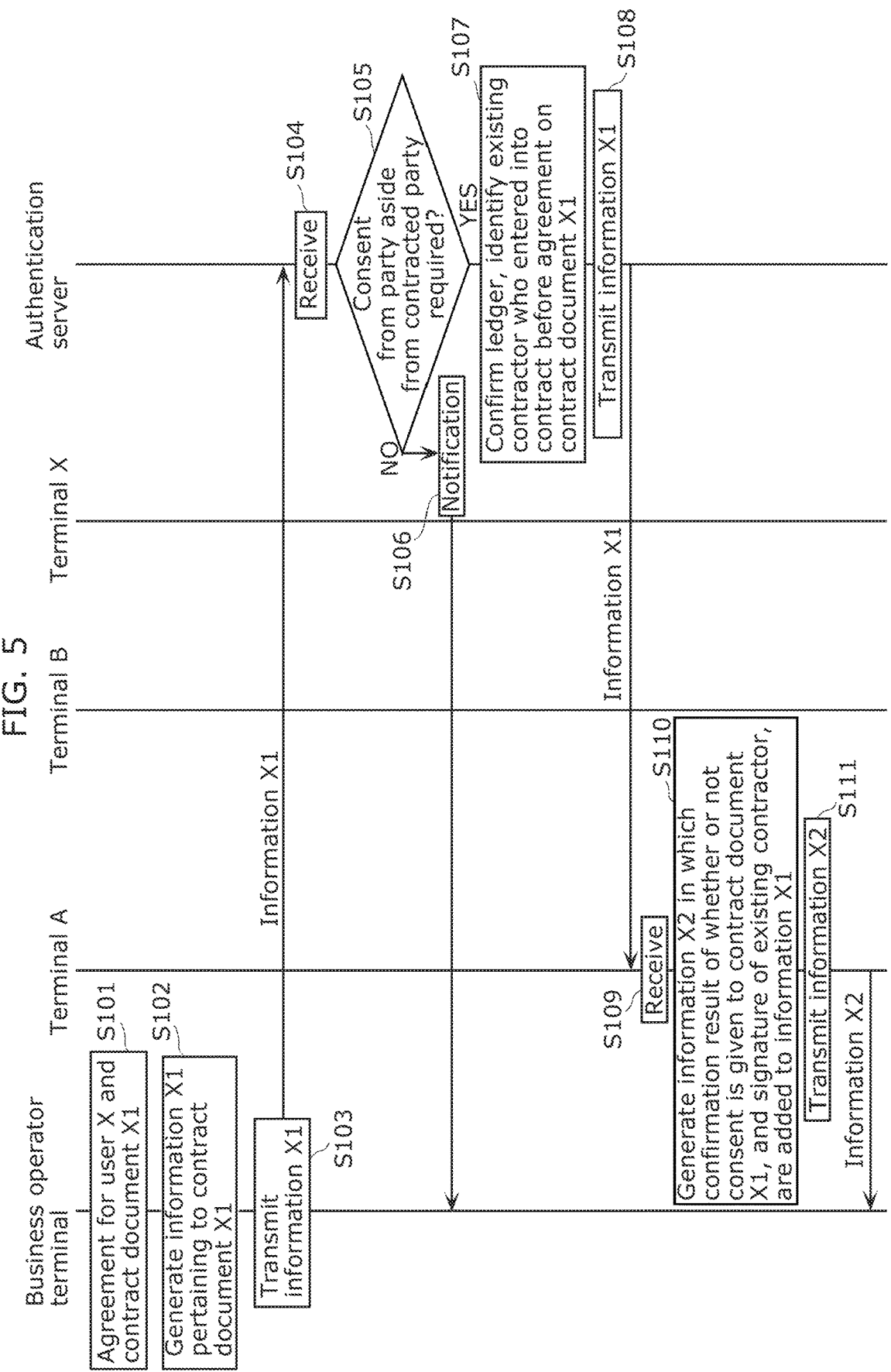
FIG. 5 is a sequence chart illustrating auditing processing by the management system according to Embodiment 1.
Figure 6:
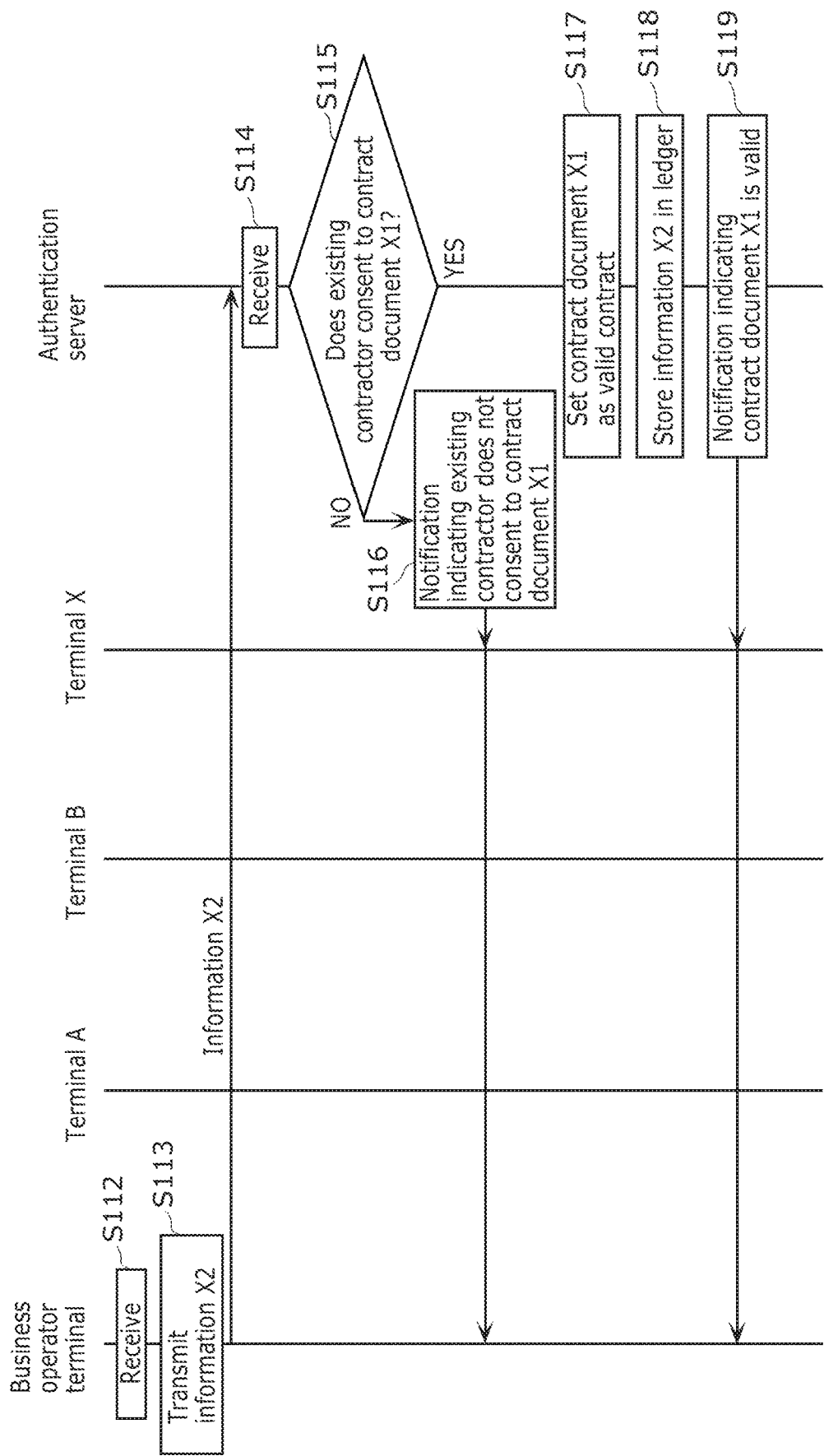
FIG. 6 is a sequence chart illustrating auditing processing by the management system according to Embodiment 1.

FIGS. 5 and 6 are sequence charts illustrating auditing processing by the management system according to Embodiment 1.

First, assume that the business operator using business operator terminal 10 has agreed to contract document X1 of the first contract with user X (S101). As described above, the business operator is an example of the first user, which is one party of the two parties who agreed to the first contract, and user X is an example of the third user, who is the other of the two parties. Contract document X1 is an example of the first contract and is data including the contract content of the first contract.

Next, business operator terminal 10 generates information X1 pertaining to contract document X1 in response to an operation by the business operator (S102). As described above, information X1 includes the data of contract document X1, the time information, the contractor ID, and the digital signature of the generator of information X1, and may further include a serial number for ascertaining the order in which the first contract was entered into.

Next, business operator terminal 10 transmits information X1 generated in step S102 to authentication server 30 (S103).

Next, authentication server 30 receives information X1 transmitted in step S103 (S104).

Next, authentication server 30 determines whether or not the consent of a party aside from the contracted parties of contract document X1 indicated in information X, i.e., aside from user X and the business operator, is required (S105). More specifically, authentication server 30 determines whether or not the consent of an existing contractor, i.e., an audit by the existing contractor, is required in order to validate contract document X1 indicated by information X.

If it is determined in step S105 that the first contract is an initial contract and consent of a party aside from the contracted parties is not required (NO in S105), authentication server 30 notifies business operator terminal 10 that contract document X1 in information X1 is valid (S106).

On the other hand, if it is determined in step S105 that the consent of a party aside from the contracted parties is required (YES in S105), authentication server 30 confirms the ledger in ledger storage 304 and identifies an existing contractor who entered into the contract earlier in time than the agreement to contract document X1 (S107). In the present embodiment, authentication server 30 identifies the user of terminal A as the second user, who is the existing contractor.

Next, authentication server 30 transmits information X1 to terminal A, which is terminal 20 of the existing contractor identified (S108).

Next, terminal A receives information X1 transmitted in step S108 (S109).

Next, in response to an operation by the second user, who is the existing contractor, terminal A generates information X2, in which the confirmation result indicating whether or not there is consent to contract document X1 and the digital signature of the second user, who is the existing contractor, are added to information X1 (S110). As described above, information X2 is an example of the second information in which the confirmation result for the existing contractor and the digital signature of the existing contractor are added to the first information.

Next, terminal A transmits information X2 generated in step S110 to business operator terminal 10 (S111). Note that terminal A may transmit information X2 generated in step S110 to authentication server 30. In this case, the subsequent steps S112 and S113 may be skipped.

Next, business operator terminal 10 receives information X2 transmitted in step S111 (S112).

Next, business operator terminal 10 transmits information X2 received in step S112 to authentication server 30 (S113).

Next, authentication server 30 receives information X2 transmitted in step S113 (S114).

Next, authentication server 30 confirms information X2 received in step S114, and verifies whether the existing contractor has consented to contract document X1 (S115). More specifically, authentication server 30 verifies whether the existing contractor has consented to contract document X1 by confirming whether the confirmation result included in information X2 received in step S114 indicates consent to contract document X1.

If it is confirmed in step S115 that the existing contractor does not consent to contract document X1 (NO in S115), authentication server 30 notifies business operator terminal 10 and terminal X that the existing contractor has not consented to contract document X1 (S116). Through this, the business operator using business operator terminal 10 and user X using terminal X are notified that the existing contractor does not consent to contract document X1, and can therefore be prompted to reconsider the first contract, i.e., reconsider the contract content of contract document X1. Note that authentication server 30 may notify business operator terminal 10 or terminal X that the existing contractor has not consented to contract document X1.

On the other hand, if in step S115 it is confirmed that the existing contractor consents to contract document X1 (YES in S115), authentication server 30 sets contract document X1 as a valid contract (S117). Here, authentication server 30 sets contract document X1 as a valid contract by including a flag indicating that the contract is valid in information X2.

Next, authentication server 30 stores information X2, including the flag indicating that the contract is valid, in the ledger of ledger storage 304 (S118).

Next, authentication server 30 notifies business operator terminal 10 and terminal X that contract document X1 in information X2 is valid (S119). Note that the timing at which authentication server 30 makes the notification that contract document X1 in information X2 is valid is not limited to the above case, and may be before step S117 or step S118. Authentication server 30 may also notify only business operator terminal 10 that contract document X1 in information X2 is valid.

In this manner, the management system according to the present embodiment can cause an existing contractor to audit contract document X1 of a newly-formed contract. The management system according to the present embodiment then stores contract document X1 of the contract validated in response to a result of the audit in the ledger.

Note that the timing at which step S118 is executed may be before step S116. In this case, if it is confirmed in step S115 that the existing contractor does not consent to contract document X1, authentication server 30 may delete information X2 from the ledger in ledger storage 304.

The processing of step S106, i.e., the processing through which business operator terminal 10 is notified that contract document X1 in information X1 is valid, will be described in detail next with reference to FIG. 7.

Figure 7:
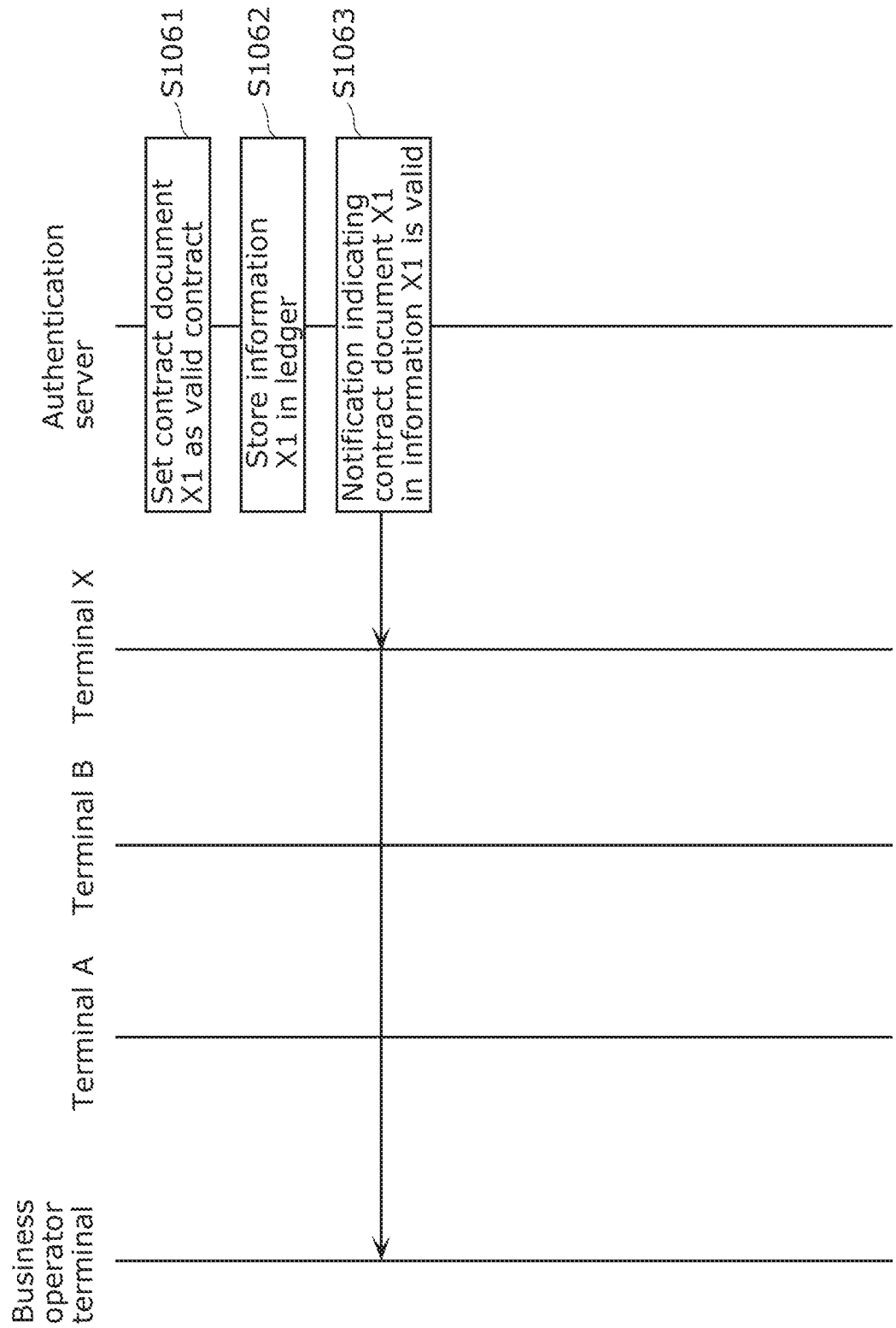
FIG. 7 is a sequence chart illustrating, in detail, the processing of step S106 in FIG. 5.

FIG. 7 is a sequence chart illustrating, in detail, the processing of step S106 in FIG. 5.

In the notification processing of step S106, first, authentication server 30 sets contract document X1 as a valid contract by including a flag indicating that the contract is valid in information X1 (S1061).

Next, authentication server 30 stores information X1, including the flag indicating that the contract is valid, in the ledger of ledger storage 304 (S1062).

Next, authentication server 30 notifies business operator terminal 10 and terminal X that contract document X1 is valid (S1063). Note that the timing at which authentication server 30 makes the notification that contract document X1 is valid is not limited to the above case, and may be before step S1061 or step S1062. Authentication server 30 may also notify only business operator terminal 10 that contract document X1 in information X1 is valid.

Effects, Etc.

As described thus far, with the management system and the like according to Embodiment 1, an existing contractor be caused to audit a newly-formed contract, and furthermore, information pertaining to a contract validated in response to a result of the audit can be stored in a ledger.

Through this, a newly-formed contract can be reliably audited, which makes it possible to suppress situations in which a business operator and a user collude on a contract.

Although the foregoing assumes that the existing contractor who audits the contract document of the newly-formed contract is a single person, the configuration is not limited thereto. The number of existing contractors who perform the audit need only be one or more.

Figure 8:
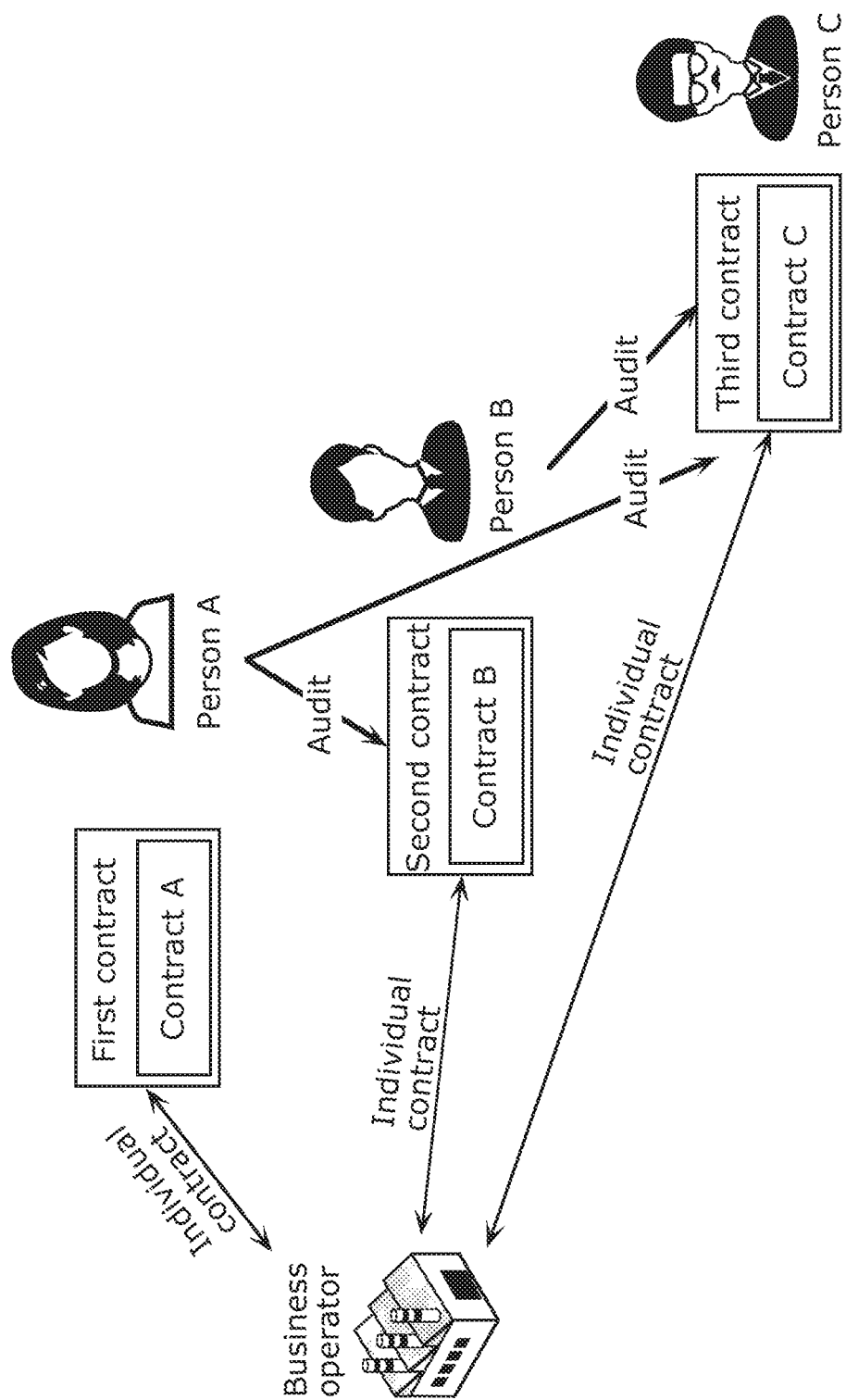
FIG. 8 is a diagram for conceptually illustrating an audit, and an existing contractor who performs the audit, according to Embodiment 1.

The audit on the newly-formed contract, and the existing contractor performing the audit, will be described here with reference to FIG. 8. FIG. 8 is a diagram for conceptually illustrating an audit, and an existing contractor who performs the audit, according to Embodiment 1.

As illustrated in FIG. 8, assume that person A first enters into an individual contract with a business operator. In this case, a contract of person B, who enters into an individual contract with the business operator, is the second individual contract with the business operator, and contract document B of person B's contract is audited by person A, who is an existing contractor. Likewise, a contract of person C, who enters into an individual contract with the business operator, is the third individual contract with the business operator, and contract document C of person C's contract is audited by person A and person B, who are existing contractors. Note that contract document C of person C's contract may be audited by person A or person B, both of whom are existing contractors.

In this manner, having an existing contractor audit a newly-formed contract makes it possible to suppress situations in which a business operator and a user collude on a contract.

Embodiment 2

Embodiment 1 described storing the contract document of a contract validated in response to the result of an audit in a ledger. This ledger may be a blockchain-based distributed ledger, or may be a distributed ledger in which a plurality of ledgers having the same content are built on blockchain infrastructure.

Embodiment 2 will describe a case where authentication servers have a distributed ledger constituted by a plurality of ledgers having the same content. The following descriptions will focus upon the differences from Embodiment 1.

Management System

Figure 9:
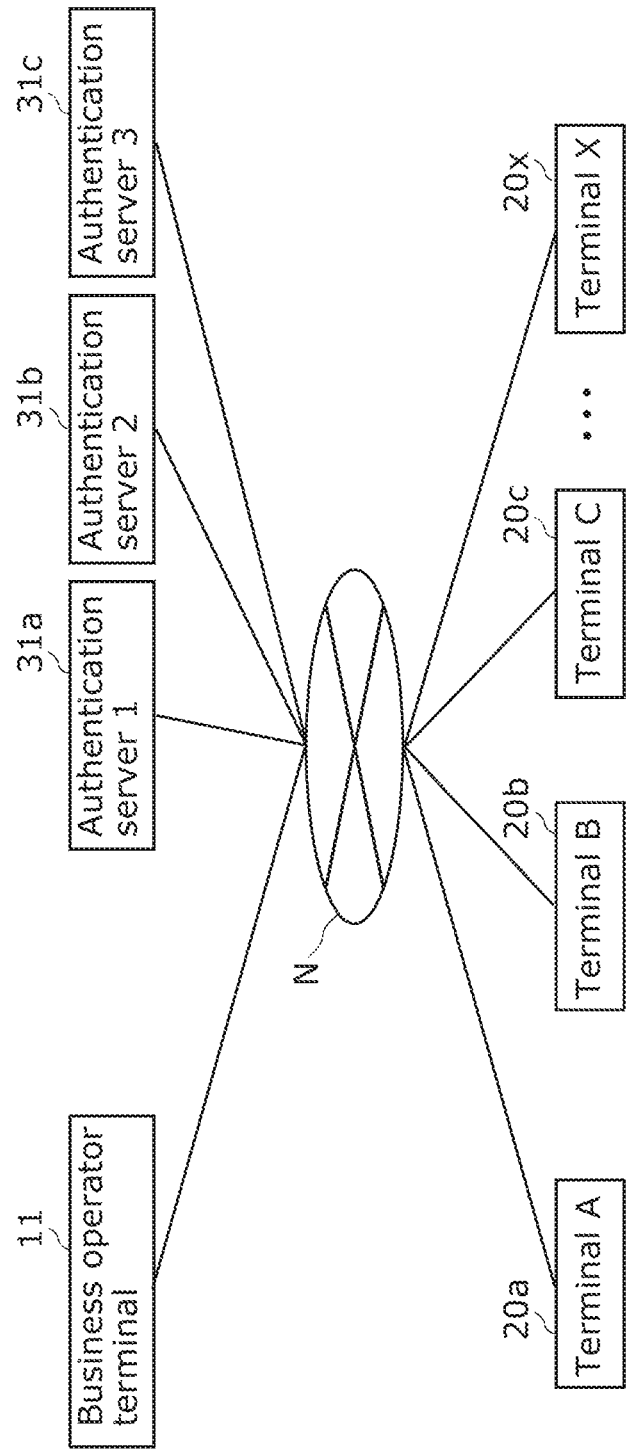
FIG. 9 is a diagram illustrating an example of the configuration of a management system according to Embodiment 2.

FIG. 9 is a diagram illustrating an example of the configuration of a management system according to Embodiment 2. Elements identical to those in FIG. 1 are given the same reference signs and will not be described in detail.

The management system illustrated in FIG. 9 differs from the management system according to Embodiment 1 in terms of the configuration of business operator terminal 11 and the configurations of authentication server 31a to authentication server 31c. Although each of authentication servers 31a to 31c will also be called "authentication server 31" hereinafter, authentication server 31a to authentication server 31c may also be referred to as "authentication server 1" to "authentication server 3".

Business operator terminal 11 will be described first.

Business Operator Terminal 11

Business operator terminal 11 is an example of a terminal used by a user, and is a first terminal used by a first user who is one of two parties who have agreed to a first contract.

Figure 10:
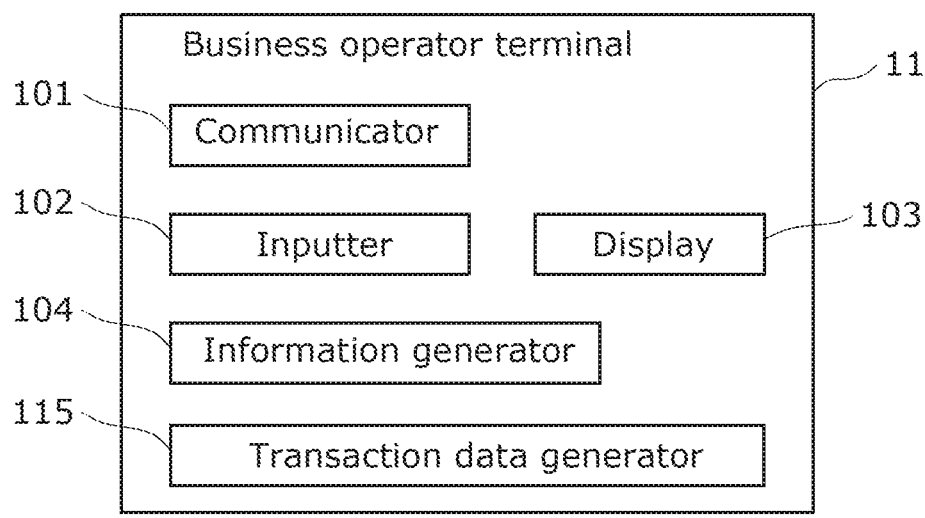
FIG. 10 is a diagram illustrating an example of the configuration of a business operator terminal according to Embodiment 2.

In the present embodiment, business operator terminal 11 is a terminal used by a business operator, who is one user. Business operator terminal 11 may be a personal computer, for example, or may be a mobile terminal such as a smartphone, a tablet, or the like. FIG. 10 is a diagram illustrating an example of the configuration of business operator terminal 11 according to Embodiment 2. Elements identical to those in FIG. 2 are given the same reference signs and will not be described in detail.

Business operator terminal 11 illustrated in FIG. 10 differs from business operator terminal 10 according to Embodiment 1 in that transaction data generator 115 is further included.

Transaction Data Generator 115

Transaction data generator 115 generates transaction data.

In the present embodiment, transaction data generator 115 generates transaction data X2 including information X2 received from terminal 20.

If a notification indicating that contract document X1 in information X1 is valid has been made by authentication server 31, transaction data generator 115 generates transaction data X1 including information X1 generated by information generator 104.

Here, transaction data X1 including information X1 includes the data of contract document X1, time information, a contractor ID, and a digital signature of the generator of information X1. Transaction data X1 including information X1 may further include a serial number for ascertaining the order in which the first contract was entered into. Additionally, transaction data X2 including information X2 includes the data of contract document X1, the time information, the contractor ID, the digital signature of the generator of information X1, the digital signature of the existing contractor who audited contract document X1, and the digital signature of the generator of transaction data X2.

Transaction data generator 115 transmits the generated transaction data X1 or X2 to authentication server 31 via communicator 101.

Authentication server 31a to authentication server 31c will be described next. Here, authentication server 31a to authentication server 31c have the same configuration, and will therefore be referred to as "authentication server 31".

Authentication Server 31

Authentication server 31 is an example of a first server.

Figure 11:
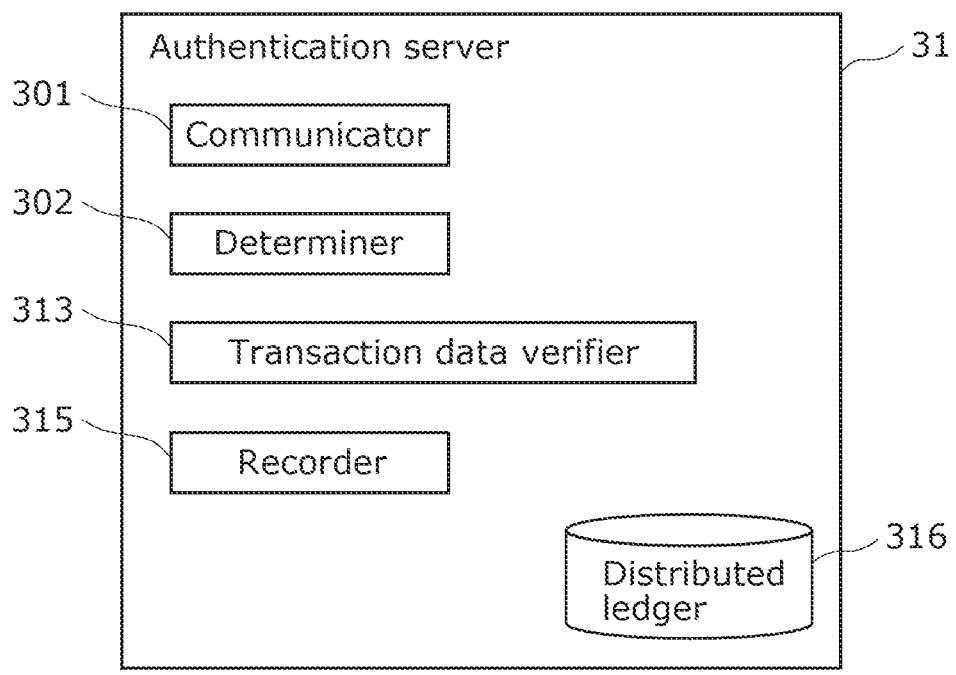
FIG. 11 is a diagram illustrating an example of the configuration of an authentication server according to Embodiment 2.

FIG. 11 is a diagram illustrating an example of the configuration of authentication server 31 according to Embodiment 2. Elements identical to those in FIG. 4 are given the same reference signs and will not be described in detail.

Authentication server 31 illustrated in FIG. 11 differs from authentication server 30 according to Embodiment 1 in that verifier 303 and ledger storage 304 are not included, and transaction data verifier 313, recorder 315, and distributed ledger 316 are further included. Authentication server 31, too, can be implemented by a processor executing a predetermined program using memory.

Communicator 301

Communicator 301 receives the first information pertaining to the first contract from the first terminal used by the first user, who is one of the two parties who have agreed to the first contract. Communicator 301 transmits the first information to a second terminal used by the second user identified by determiner 302. Additionally, communicator 301 obtains the second information, in which the confirmation result indicating whether the second user consents or does not consent to the first contract and the digital signature of the second user is added to the first information. More specifically, communicator 301 obtains second information by receiving the transaction data including that second information.

In the present embodiment, communicator 301 notifies business operator terminal 11 over network N that the existing contractor does not consent to contract document X1 or that contract document X1 is active, transmits information X1 to terminal A among terminals 20, and the like. Additionally, communicator 301 receives information X1 from business operator terminal 11, receives transaction data X2 including information X2 from terminal A among terminals 20, and the like.

Note that communicator 301 receives transaction data X1 including information X1 from business operator terminal 11 upon making a notification that contract X1 of information X1 is valid because an audit by an existing contractor is not required in order to validate contract document X1.

Transaction Data Verifier 313

When communicator 301 receives transaction data including the first information pertaining to the first contract or the second information, transaction data verifier 313 verifies the validity of the transaction data. For example, transaction data verifier 313 verifies whether the transaction data received by communicator 301 has been given a digital signature generated by a correct method. Note that this verification may be skipped.

Additionally, transaction data verifier 313 confirms the second information included in the transaction data received by communicator 301, and if the confirmation result included in the second information indicates consent to the first contract, the first contract is set as a valid contract. Here, transaction data verifier 313 may set the first contract as a valid contract by including a flag indicating that the first contract is a valid contract in the second information included in the transaction data. Additionally, transaction data verifier 313 sets the first contract in the first information as a valid contract by including a flag indicating that the contract in the first information included in the transaction data received by communicator 301 is valid.

Additionally, transaction data verifier 313, along with other authentication servers 31, executes a consensus algorithm for agreeing on the validity of the transaction data.

Here, Practical Byzantine Fault Tolerance (PBFT) may be used as the consensus algorithm, or another publicly-known consensus algorithm may be used. For example, Proof of Work (PoW), Proof of Stake (PoS), or the like can be given as publicly-known consensus algorithms. When PBFT is used as the consensus algorithm, transaction data verifier 313 receives reports from the other authentication servers 31 indicating whether or not the verification of the transaction data has succeeded, and determines whether or not the number of the reports exceeds a predetermined number. When the number of the reports exceeds the predetermined number, transaction data verifier 313 may determine that the validity of the transaction data has been verified by the consensus algorithm.

When the validity of the transaction data has been verified, transaction data verifier 313 causes recorder 315 to record that transaction data.

In the present embodiment, transaction data verifier 313 verifies the validity of transaction data X1 including information X1 or transaction data X2 including information X2, received by communicator 301.

Additionally, transaction data verifier 313 confirms information X2 in transaction data X2 received by communicator 301, and if the confirmation result included in information X2 indicates consent to the first contract, the first contract is set as a valid contract. Here, transaction data verifier 313 sets the first contract as a valid contract by including a flag indicating that the first contract is a valid contract in information X2 included in transaction data X2.

Furthermore, transaction data verifier 313 executes a consensus algorithm for agreeing on the validity of transaction data X2 including information X2, which includes the flag indicating that the first contract is a valid contract. When the validity of transaction data X2 is confirmed, transaction data verifier 313 causes recorder 315 to record that transaction data X2.

Recorder 315

By including the transaction data for which the validity has been verified by transaction data verifier 313 in blocks and recording the blocks into distributed ledger 316, recorder 315 records the transaction data.

Note that distributed ledger 316 may be configured within recorder 315.

Distributed Ledger 316

Distributed ledger 316 stores transaction data including information pertaining to past valid contracts. In the present embodiment, distributed ledger 316 stores contract document X1 of first contract which has been validated by transaction data verifier 313 storing transaction data X2 or X1, which include information X2 or information X1 including a flag indicating that the contract is valid.

Operations, Etc. of Management System

Operations of the management system configured as described above will be described next.

Figure 12:
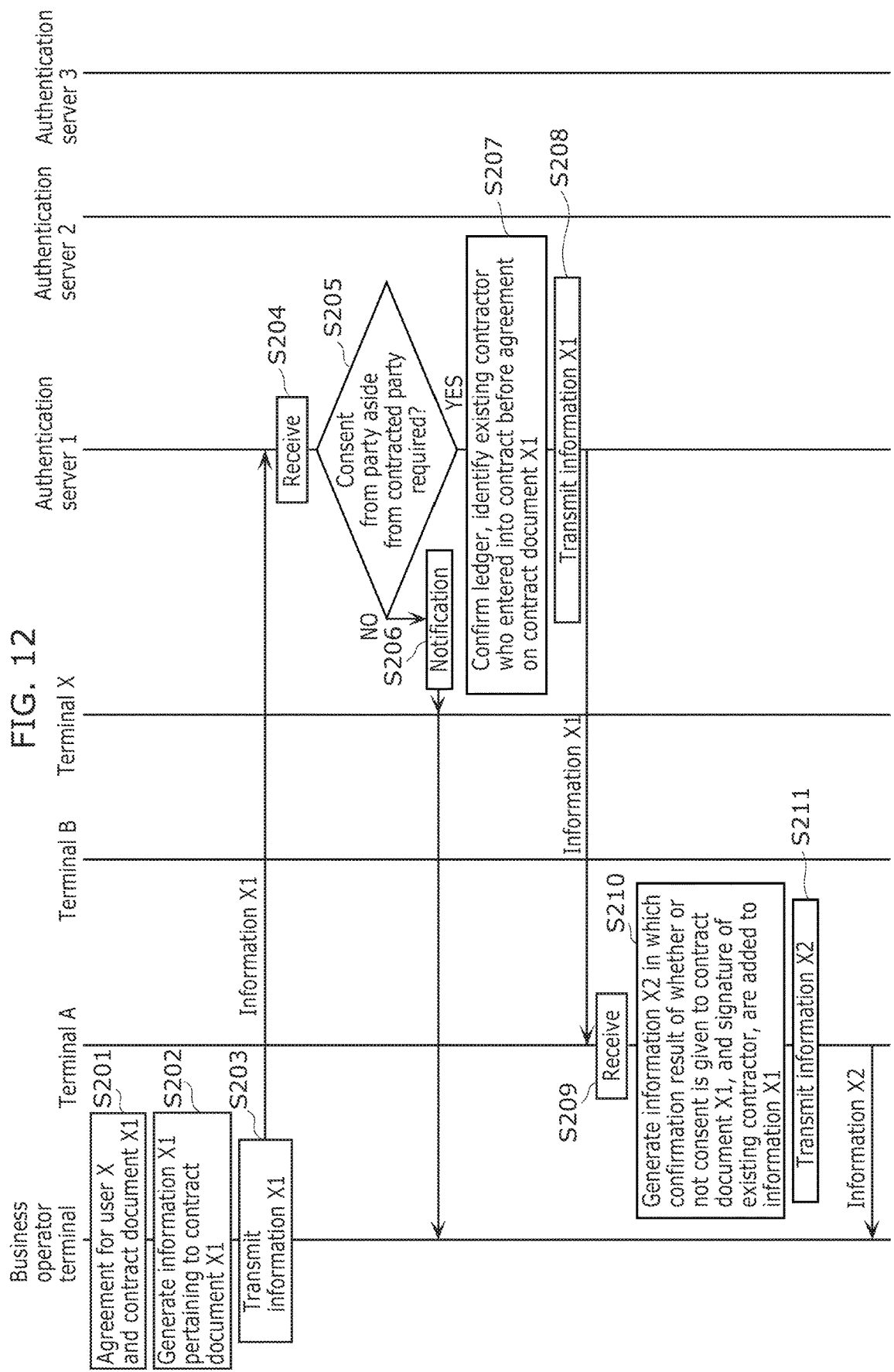
FIG. 12 is a sequence chart illustrating auditing processing by the management system according to Embodiment 2.
Figure 13:
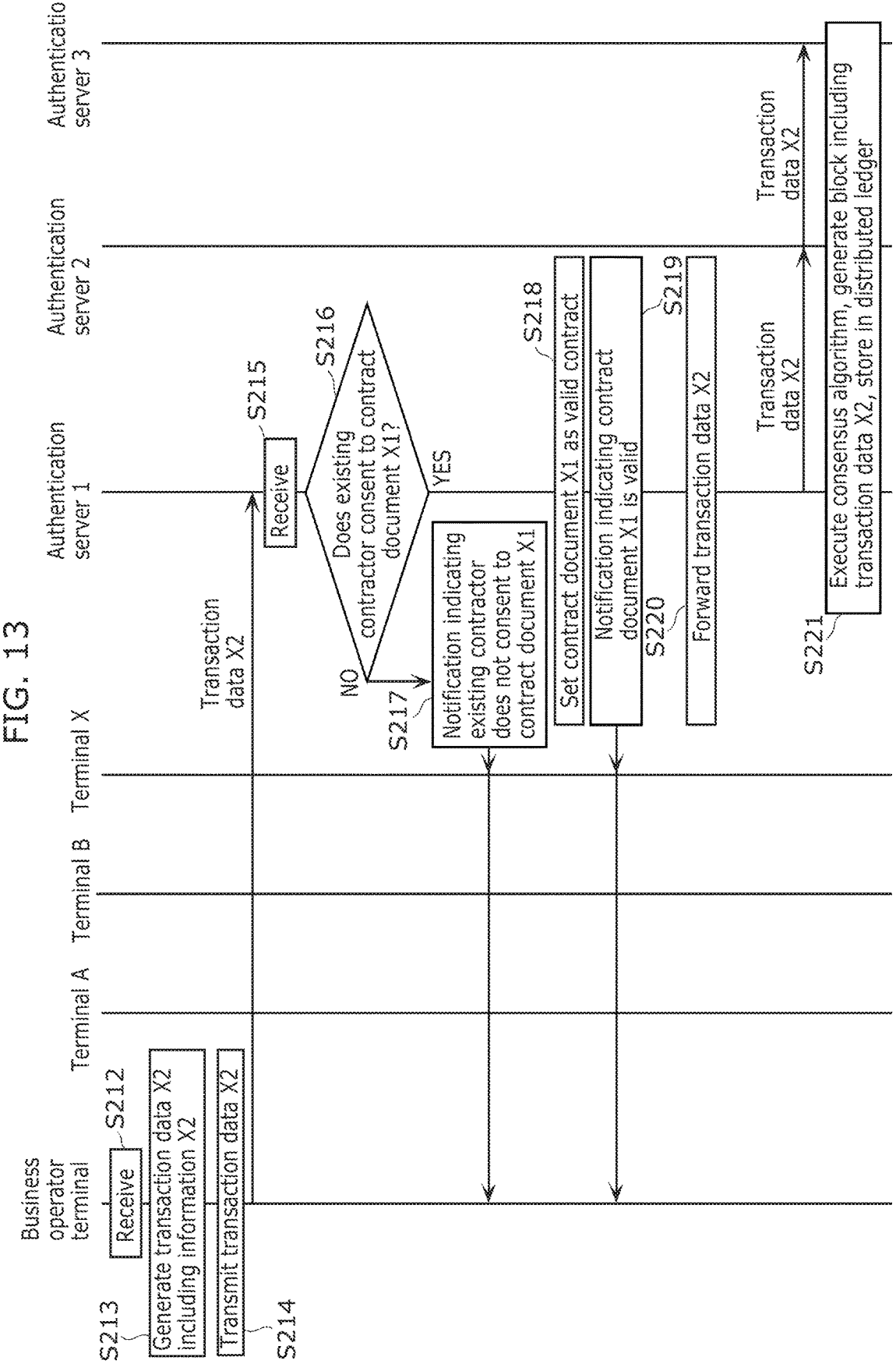
FIG. 13 is a sequence chart illustrating auditing processing by the management system according to Embodiment 2.

FIGS. 12 and 13 are sequence charts illustrating auditing processing by the management system according to Embodiment 2. Aside from authentication server 30 serving as authentication server 1, step S201 to step S211 illustrated in FIG. 12 perform the same processing as step S101 to step S111 illustrated in FIG. 5, and will therefore not be described.

In step S212, business operator terminal 11 receives information X2 transmitted by terminal A in step S211.

Next, business operator terminal 11 generates transaction data X2 including information X2 received in step S212 (S213).

Next, business operator terminal 11 transmits transaction data X2 including information X2, generated in step S213, to authentication server 1, for example (S214). Note that business operator terminal 11 may broadcast transaction data X2 including information X2 to authentication server 1 to authentication server 3.

Next, authentication server 1 receives transaction data X2 including information X2 transmitted by business operator terminal 11 in step S214 (S215).

Next, authentication server 1 confirms information X2 included in transaction data X2 received in step S215, and verifies whether the existing contractor has consented to contract document X1 (S216). More specifically, authentication server 1 verifies whether the existing contractor has consented to contract document X1 by confirming whether the confirmation result included in information X2 included in transaction data X2 received in step S215 indicates consent to contract document X1.

If it is verified in step S216 that the existing contractor does not consent to contract document X1 (NO in S216), authentication server 1 notifies business operator terminal 11 and terminal X that the existing contractor has not consented to contract document X1 (S217). Through this, the business operator using business operator terminal 11 and user X using terminal X are notified that the existing contractor does not consent to contract document X1, and can therefore be prompted to reconsider the first contract, i.e., reconsider the contract content of contract document X1. Note that authentication server 1 may notify only business operator terminal 11 that the existing contractor has not consented to contract document X1.

On the other hand, if in step S216 it is verified that the existing contractor consents to contract document X1 (YES in S216), authentication server 1 sets contract document X1 as a valid contract (S218). Here, authentication server 1 sets contract document X1 as a valid contract by including a flag indicating that the contract is valid in information X2 included in transaction data X2.

Next, authentication server 1 notifies business operator terminal 11 and terminal X that contract document X1 is valid (S219). Note that the timing at which authentication server 1 makes the notification that contract document X1 is valid is not limited to the above case, and may be before step S218.

Next, authentication server 1 forwards transaction data X2 to other authentication servers 31, i.e., to authentication server 2 and authentication server 3 (S220).

Next, authentication server 1, authentication server 2, and authentication server 3 execute the consensus algorithm, generate a block including transaction data X2, and store the block in distributed ledger 316 (S221).

In this manner, the management system according to the present embodiment can cause an existing contractor to audit contract document X1 of a newly-formed contract. The management system according to the present embodiment then stores contract document X1 of the contract validated in response to a result of the audit in distributed ledger 316, within the transaction data.

The processing of step S206, i.e., the processing through which business operator terminal 11 is notified that contract document X1 in information X1 is valid, will be described in detail next with reference to FIG. 14.

Figure 14:
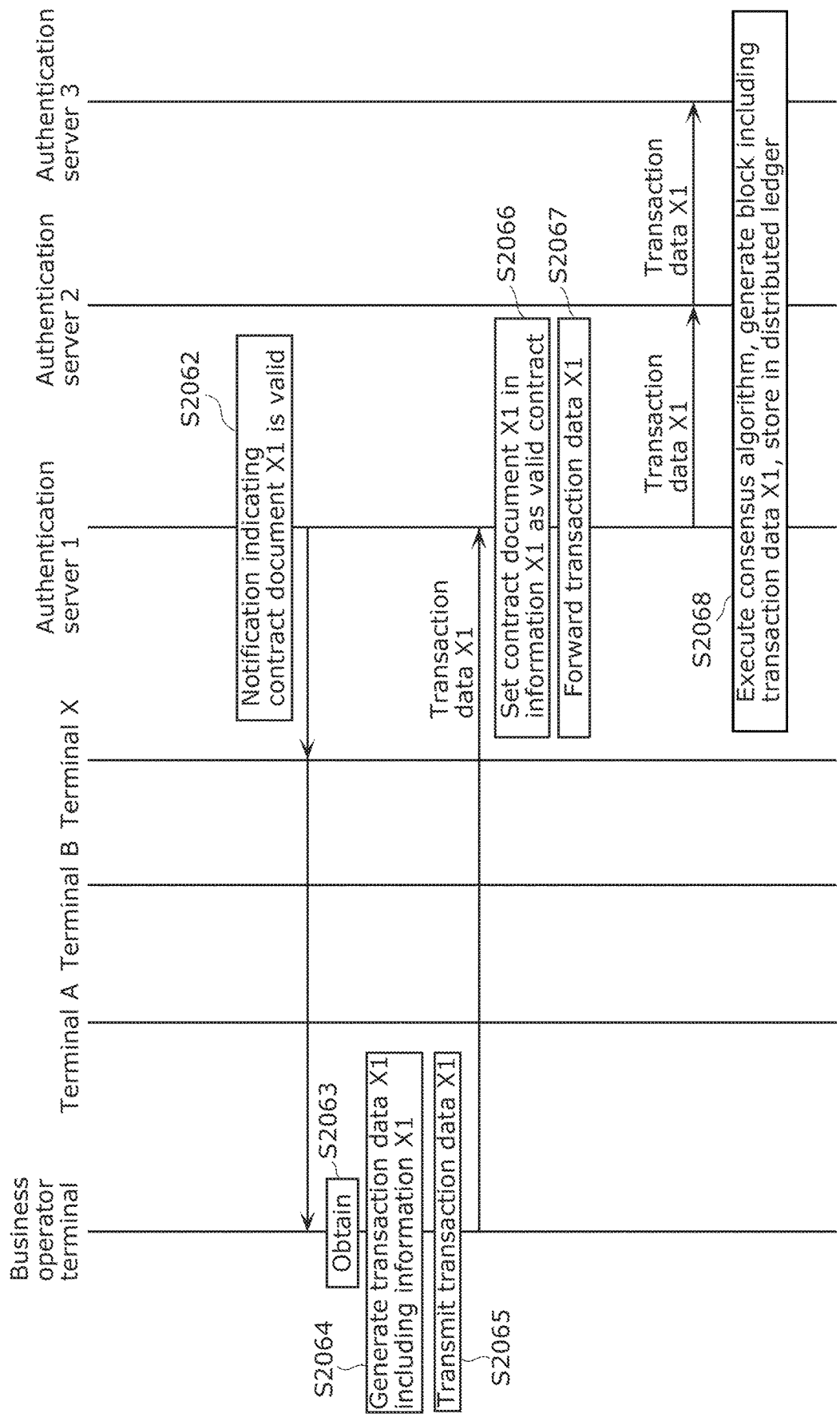
FIG. 14 is a sequence chart illustrating, in detail, the processing of step S206 in FIG. 12.

FIG. 14 is a sequence chart illustrating, in detail, the processing of step S206 in FIG. 12.

In the notification processing in step S206, first, authentication server 1 notifies business operator terminal 11 and terminal X that contract document X1 is valid (S2062).

Next, business operator terminal 11 obtains the notification that contract document X1 is valid, made in step S2062 (S2063), and generates transaction data X1 including information X1 (S2064).

Next, business operator terminal 11 transmits transaction data X1 including information X1, generated in step S2064, to authentication server 1, for example (S2065).

Next, authentication server 1 sets contract document X1 in information X1 as a valid contract by including a flag indicating that the contract is valid in information X1 (S2066).

Next, authentication server 1 forwards transaction data X1, which includes the flag indicating that the contract is valid in information X1, to other authentication servers 31, i.e., to authentication server 2 and authentication server 3 (S2067).

Next, authentication server 1, authentication server 2, and authentication server 3 execute the consensus algorithm, generate a block including transaction data X1, and store the block in distributed ledger 316 (S2068).

Effects, Etc.

As described thus far, with the management system and the like according to Embodiment 2, an existing contractor be caused to audit a newly-formed contract, and furthermore, transaction data including information pertaining to a contract validated in response to a result of the audit can be stored in a distributed ledger.

Through this, a newly-formed contract can be audited, which makes it possible to suppress situations in which a business operator and a user collude on a contract. Additionally, the information pertaining to the contract which has been audited and validated is stored in the distributed ledger, which makes it possible to prevent a newly-formed contract from being tampered with at a later date. Accordingly, situations where the business operator and the user collude on a contract can be suppressed more reliably.

Although the foregoing assumes that the existing contractor who audits the contract document of the newly-formed contract is a single person, the configuration is not limited thereto. As described in Embodiment 1, the number of existing contractors who perform the audit need only be one or more.

Variation

Although transaction data X2 of information X2 transmitted by terminal A is described as being generated by business operator terminal 11 in the auditing processing illustrated in FIGS. 12 and 13, the configuration is not limited thereto. If authentication servers 31 are further provided with transaction data generators, one of authentication servers 31 may generate transaction data X2 of information X2. Auditing processing performed in this case will be described with reference to FIGS. 15 and 16. The following descriptions will focus upon the differences from the foregoing Embodiment 2.

Figure 15:
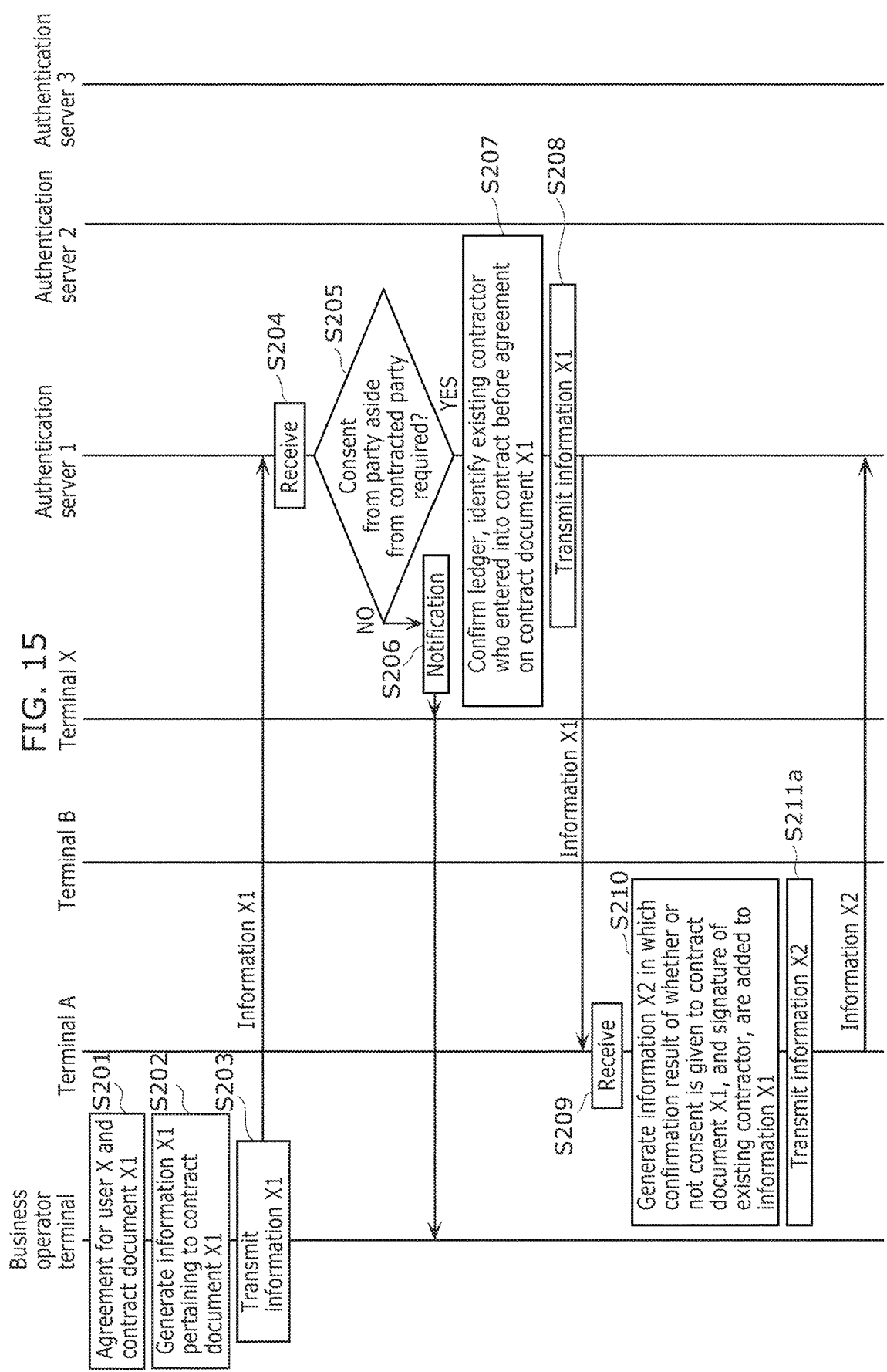
FIG. 15 is a sequence chart illustrating auditing processing by the management system according to a variation on Embodiment 2.
Figure 16:
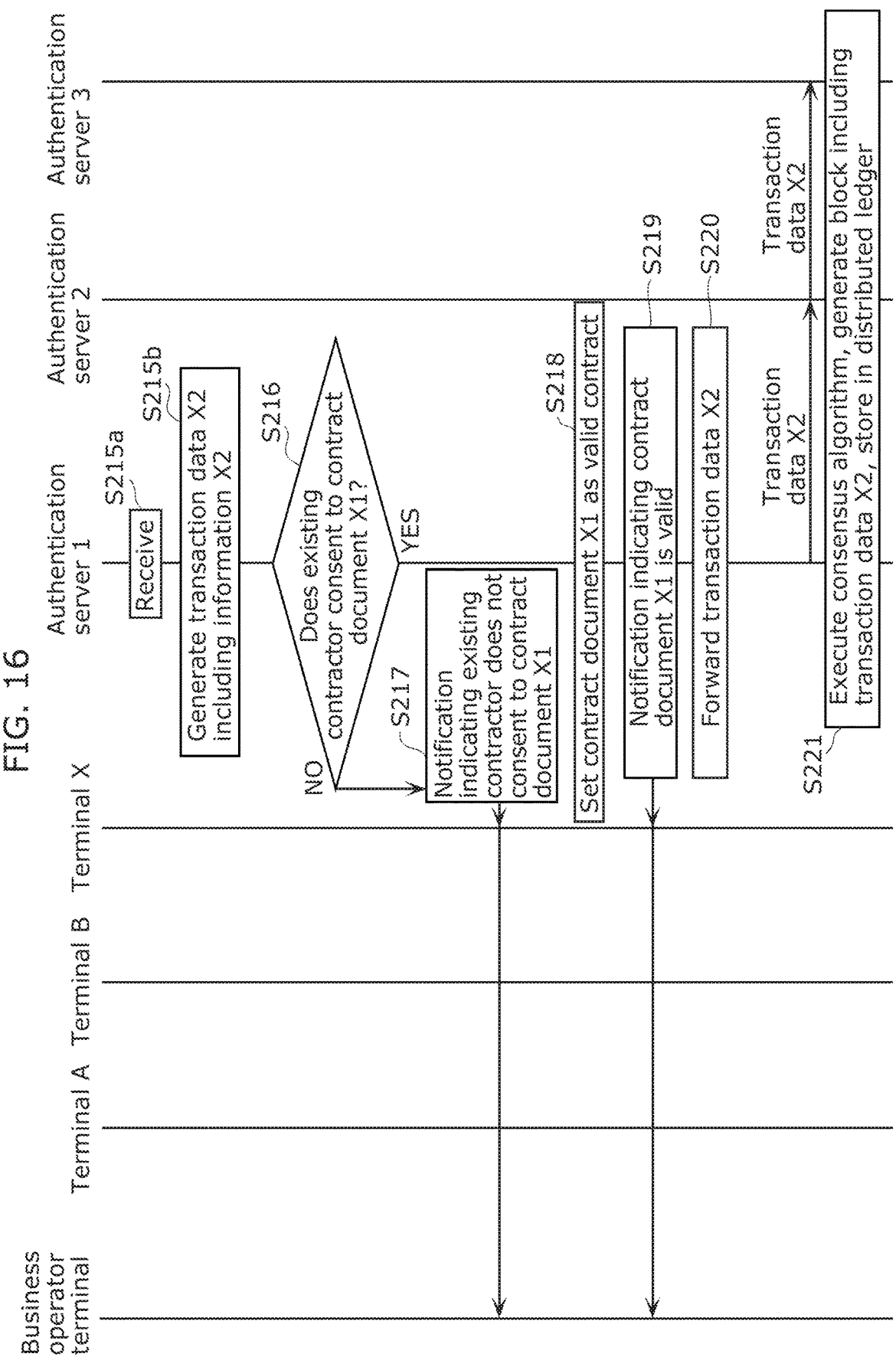
FIG. 16 is a sequence chart illustrating auditing processing by the management system according to a variation on Embodiment 2.

FIGS. 15 and 16 are sequence charts illustrating auditing processing by the management system according to a variation on Embodiment 2. Note that elements identical to those in FIGS. 12 and 13 are given the same reference signs and will not be described in detail.

In the auditing processing illustrated in FIG. 15, the processing in step S211*a* differs from the auditing processing illustrated in FIG. 12. Furthermore, in the auditing processing illustrated in FIG. 16, the processing in step S215*a* to step S215*b* differs from the auditing processing illustrated in FIG. 13.

In step S210 illustrated in FIG. 15, terminal A generates information X2, in which the confirmation result indicating whether or not there is consent to contract document X1 and the digital signature of the second user, who is the existing contractor, are added to information X1. As described above, information X2 is an example of the second information in which the confirmation result for the existing contractor and the digital signature of the existing contractor are added to the first information.

Next, terminal A transmits information X2 generated in step S210 to authentication server 1 (S211*a*).

Next, authentication server 1 receives information X2 transmitted in step S211*a* (S215*a*).

Next, authentication server 1 generates transaction data X2 including information X2 received in step S215*a* (S215*b*).

The subsequent step S216 to step S221 are the same as those described above, and will therefore not be described here.

Embodiment 3

Embodiment 2 described storing a contract document validated in response to the result of an audit in distributed ledgers of the plurality of authentication servers 31 provided in the management system, but the configuration is not limited thereto. The management system may include a business operator terminal and a plurality of terminals which each have a distributed ledger, without having an authentication server. In such a case, the contract document validated as a result of the audit may be stored in the distributed ledgers of the business operator terminal and the plurality of terminals. The following descriptions will focus on points which are different from Embodiment 1 and Embodiment 2.

Management System

Figure 17:
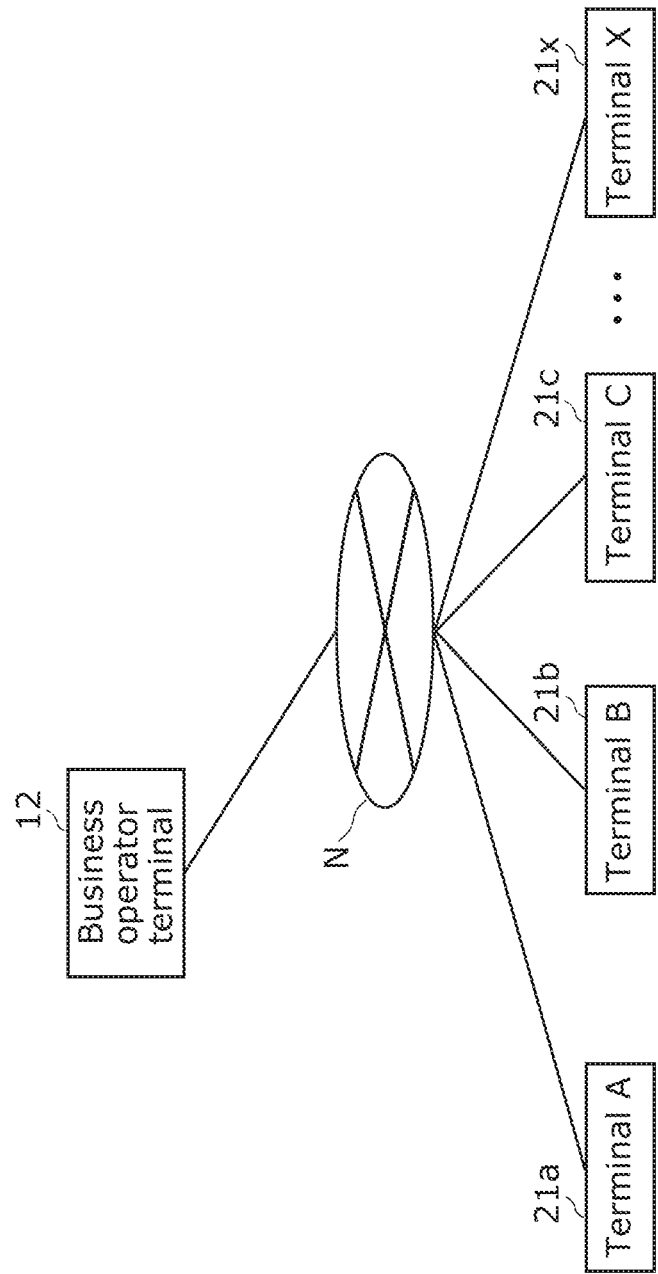
FIG. 17 is a diagram illustrating an example of the configuration of a management system according to Embodiment 3.

FIG. 17 is a diagram illustrating an example of the configuration of a management system according to Embodiment 3. Elements identical to those in FIGS. 1 and 9 are given the same reference signs and will not be described in detail.

The management system illustrated in FIG. 17 differs from the management system according to Embodiment 2 in that the plurality of authentication servers 31 are not provided, and the configurations of business operator terminal 12 and terminals 21*a* to 21*x* are different. Note that although each of terminal 21*a* to terminal 21*x* will also be called "terminal 21" hereinafter, terminal 21*a* to terminal 21*x* may also be referred to as "terminal A" to "terminal X".

Business operator terminal 12 will be described first.
Business Operator Terminal 12

Like business operator terminal 11, business operator terminal 12 is an example of a terminal used by a user, and is a first terminal used by a first user who is one of two parties who have agreed to a first contract.

In the present embodiment, business operator terminal 12 is a terminal used by a business operator, who is one user. Business operator terminal 12 may be a personal computer, for example, or may be a mobile terminal such as a smartphone, a tablet, or the like.

Figure 18:
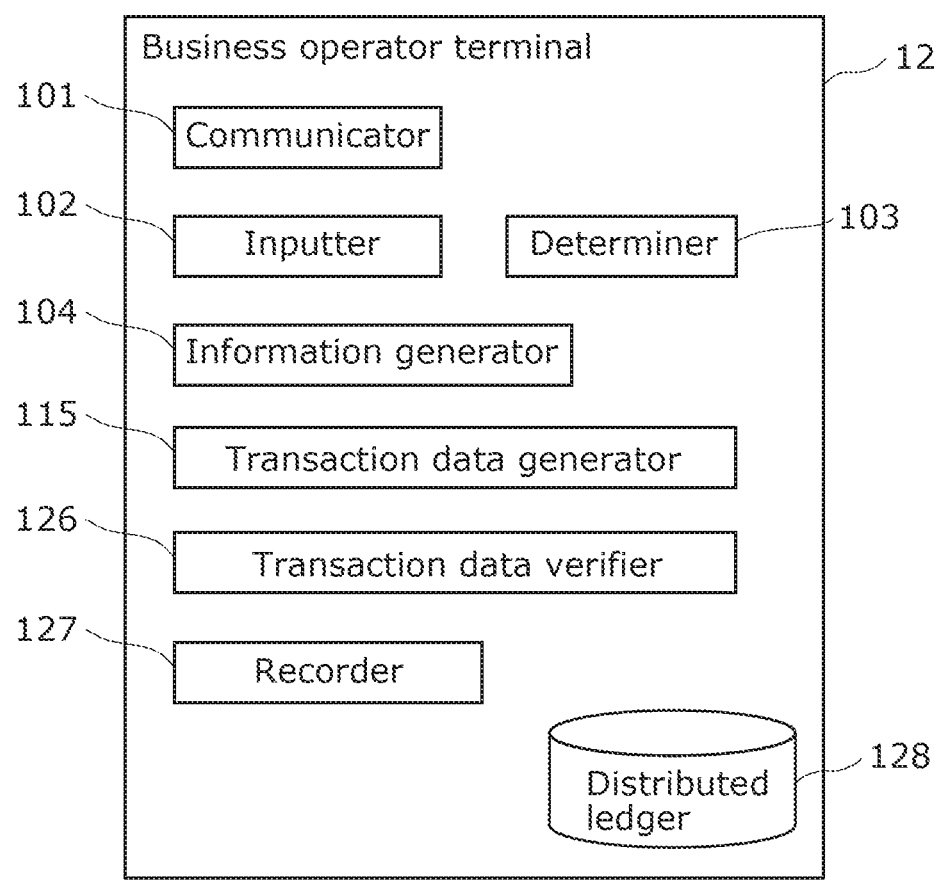
FIG. 18 is a diagram illustrating an example of the configuration of a business operator terminal according to Embodiment 3.

FIG. 18 is a diagram illustrating an example of the configuration of business operator terminal 12 according to Embodiment 3. Elements identical to those in FIGS. 2 and 10 are given the same reference signs and will not be described in detail.

Business operator terminal 12 illustrated in FIG. 18 differs from business operator terminal 11 according to Embodiment 2 in that transaction data verifier 126, recorder 127, and distributed ledger 128 are further included.
Transaction Data Verifier 126

When communicator 101 receives transaction data including the first information pertaining to the first contract or the second information, transaction data verifier 126 verifies the validity of the transaction data. Note that this verification may be skipped.

Additionally, transaction data verifier 126 sets the first contract in the first information as a valid contract by including a flag indicating that the contract in the first information included in the transaction data generated by transaction data generator 115 is valid.

Additionally, transaction data verifier 126, along with other terminals 21, executes a consensus algorithm for agreeing on the validity of the transaction data. When the validity of the transaction data is confirmed, transaction data verifier 126 causes recorder 127 to record the transaction data.

In the present embodiment, transaction data verifier 126 verifies the validity of transaction data X1 including information X1 generated by transaction data generator 115 or transaction data X2 including information X2 received by communicator 101.

Additionally, transaction data verifier 126 sets the first contract as a valid contract by including a flag indicating that the first contract is a valid contract in information X1 of transaction data X1 generated by transaction data generator 115.

Furthermore, transaction data verifier 126 executes a consensus algorithm for agreeing on the validity of transaction data X1 or X2 including information X2 or information X1, which include the flag indicating that the first contract is a valid contract. When the validity of transaction data X1 or X2 is confirmed, transaction data verifier 126 causes recorder 127 to record that transaction data X1 or X2.
Recorder 127

By including the transaction data for which the validity has been verified by transaction data verifier 126 in blocks and recording the blocks into distributed ledger 128, recorder 127 records the transaction data.

Note that distributed ledger 128 may be configured within recorder 127.
Distributed Ledger 128

Distributed ledger 128 stores transaction data including information pertaining to past valid contracts. In the present embodiment, distributed ledger 128 stores contract document X1 of first contract which has been validated by transaction data verifier 126 storing transaction data X2 or X1, which include information X2 or information X1 including a flag indicating that the contract is valid.

Terminal 21a to terminal 21x will be described next. Note that terminal 21a to terminal 21x have the same configuration, and will therefore be referred to as "terminal 21".

Terminal 21

Like terminal 20, terminal 21 is an example of a terminal used by a user. Terminal 21 may be a personal computer, for example, or may be a mobile terminal such as a smartphone, a tablet, or the like capable of accessing the distributed ledger. One of terminals 21 is a terminal used by the third user, who is the other of the two parties who have agreed to the first contract. Additionally, one of terminals 21 is a terminal used by the second user, who is a party aside from the two parties who have agreed to the first contract.

In the present embodiment, it is assumed that of the plurality of terminals 21, terminal 21a, i.e., terminal A, is a terminal used by the second user, who is a party aside from the two parties who have agreed to the first contract. Note that the second user is, for example, the other of two parties who have agreed to a second contract agreed to and validated earlier in time than the first contract and is a party different from the first user, and is called an "existing contractor".

Figure 19:
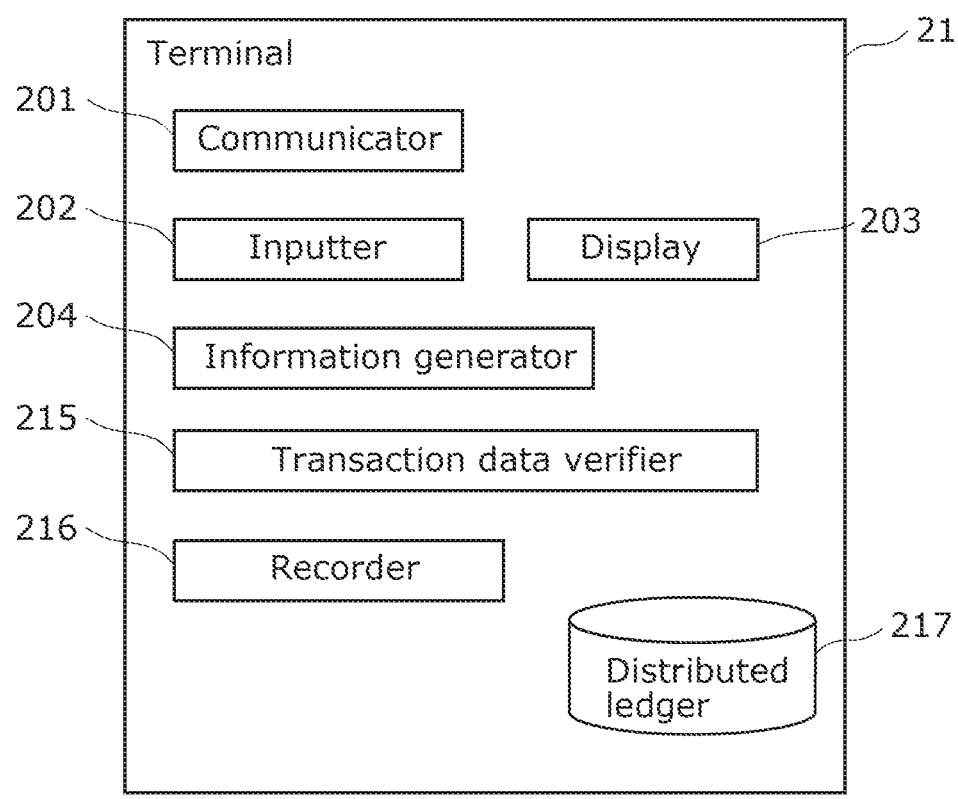
FIG. 19 is a diagram illustrating an example of the configuration of a terminal according to Embodiment 3.

FIG. 19 is a diagram illustrating an example of the configuration of terminal 21 according to Embodiment 3. Elements identical to those in FIG. 3 are given the same reference signs and will not be described in detail.

Terminal 21 illustrated in FIG. 19 differs from terminal 20 according to Embodiment 1 in that transaction data verifier 215, recorder 216, and distributed ledger 217 are further included.

Transaction Data Verifier 215

When communicator 201 receives transaction data including the first information pertaining to the first contract or the second information, transaction data verifier 215 verifies the validity of the transaction data. Note that this verification may be skipped.

Additionally, transaction data verifier 215 confirms the second information included in the transaction data received by communicator 201, and if the confirmation result included in the second information indicates consent to the first contract, the first contract is set as a valid contract. Here, transaction data verifier 215 may set the first contract as a valid contract by including a flag indicating that the first contract is a valid contract in the second information included in the transaction data.

Additionally, transaction data verifier 215, along with the other terminals 21 and business operator terminal 12, executes a consensus algorithm for agreeing on the validity of the transaction data. When the validity of the transaction data is confirmed, transaction data verifier 215 causes recorder 216 to record the transaction data.

In the present embodiment, transaction data verifier 215 verifies the validity of transaction data X1 including information X1 or transaction data X2 including information X2, received by communicator 201.

Additionally, transaction data verifier 215 confirms information X2 in transaction data X2 received by communicator 201, and if the confirmation result included in information X2 indicates consent to the first contract, the first contract is set as a valid contract. Here, transaction data verifier 215 sets the first contract as a valid contract by including a flag indicating that the first contract is a valid contract in information X2 included in transaction data X2.

Furthermore, transaction data verifier 215 executes a consensus algorithm for agreeing on the validity of transaction data X1 or X2 including information X2 or information X1, which include the flag indicating that the first contract is a valid contract. When the validity of transaction data X1 or X2 is confirmed, transaction data verifier 215 causes recorder 216 to record that transaction data X1 or X2.

Recorder 216

By including the transaction data for which the validity has been verified by transaction data verifier 215 in blocks and recording the blocks into distributed ledger 217, recorder 216 records the transaction data.

Note that distributed ledger 217 may be configured within recorder 216.

Distributed Ledger 217

Distributed ledger 217 stores transaction data including information pertaining to past valid contracts. In the present embodiment, distributed ledger 217 stores contract document X1 of first contract which has been validated by transaction data verifier 215 storing transaction data X2 or X1, which include information X2 or information X1 including a flag indicating that the contract is valid.

Operations, Etc. of Management System

Operations of the management system configured as described above will be described next.

Figure 20:
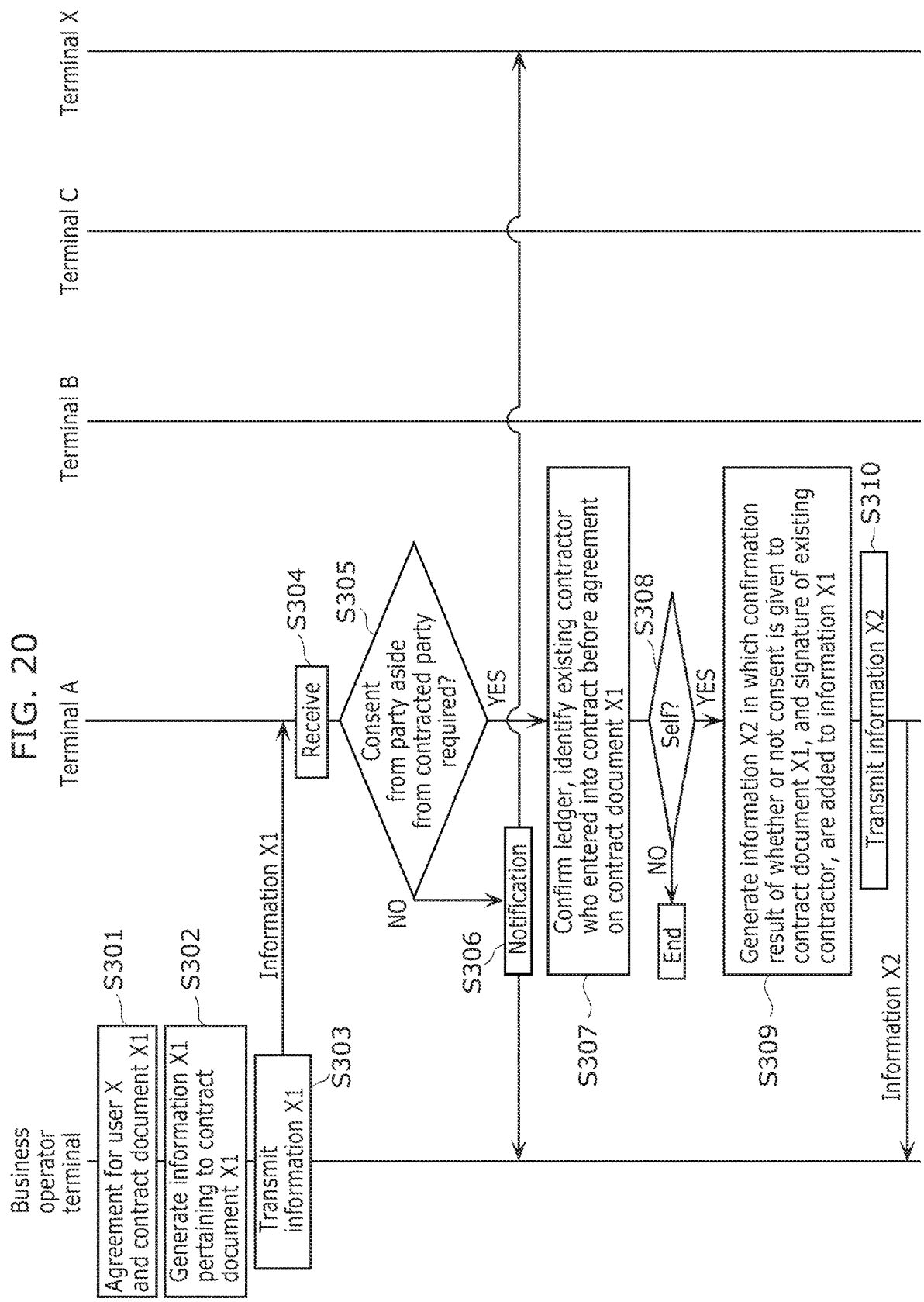
FIG. 20 is a sequence chart illustrating auditing processing by the management system according to Embodiment 3.
Figure 21:
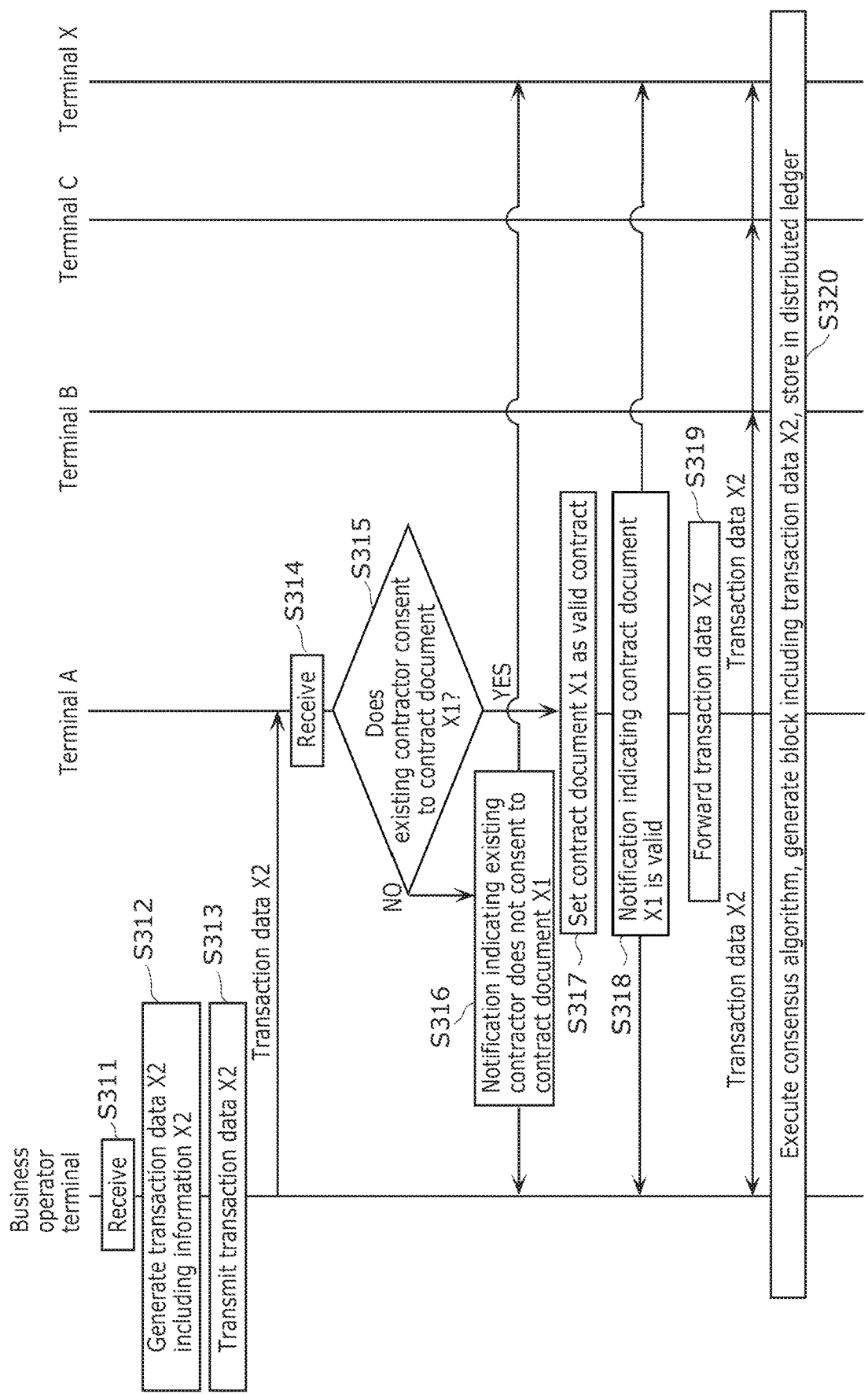
FIG. 21 is a sequence chart illustrating auditing processing by the management system according to Embodiment 3.

FIGS. 20 and 21 are sequence charts illustrating auditing processing by the management system according to Embodiment 3.

First, assume that the business operator using business operator terminal 12 has agreed to contract document X1 of the first contract with user X (S301). As described above, the business operator is an example of the first user, which is one party of the two parties who agreed to the first contract, and user X is an example of the third user, who is the other of the two parties. Contract document X1 is an example of the first contract and is data including the contract content of the first contract.

Next, business operator terminal 12 generates information X1 pertaining to contract document X1 in response to an operation by the business operator (S302).

Next, business operator terminal 12 transmits information X1 generated in step S302 to terminal A (S303).

Next, terminal A receives information X1 transmitted in step S303 (S304).

Next, terminal A determines whether or not the consent of a party aside from the contracted parties of contract document X1 indicated in information X, i.e., aside from user X and the business operator, is required (S305). More specifically, terminal A determines whether or not the consent of an existing contractor, i.e., an audit by the existing contractor, is required in order to validate contract document X1 indicated by information X.

If it is determined in step S305 that the first contract is an initial contract and consent of a party aside from the contracted parties is not required (NO in S305), terminal A notifies business operator terminal 12 and terminal X that contract document X1 in information X1 is valid (S306).

On the other hand, if it is determined in step S305 that the consent of a party aside from the contracted parties is required (YES in S305), terminal A confirms distributed ledger 217 and identifies an existing contractor who entered into the contract earlier in time than the agreement to contract document X1 (S307). In the present embodiment, terminal A identifies its own user as the second user, who is the existing contractor.

Next, terminal A confirms whether or not terminals 21 of the identified existing contractor is itself (terminal A) (S308).

Because terminal 21 of the identified existing contractor is terminal A itself in step S305 (YES in S308), terminal A generates information X2, in which the confirmation result indicating whether or not there is consent to contract document X1 and the digital signature of the second user, who is the existing contractor, are added to information X1 (S309). As described above, information X2 is an example of the second information in which the confirmation result for the existing contractor and the digital signature of the existing contractor are added to the first information.

On the other hand, if terminal 21 of the identified existing contractor is not itself (terminal A) in step S305 (NO in S308), the processing ends. Note that if terminal 21 of the identified existing contractor is not itself (terminal A), terminal A may transmit information X1 to terminal 21 of the identified existing contractor. In this case, the same processing as that of step S109 to step S111 in FIG. 5 may be performed.

Next, terminal A transmits information X2 generated in step S309 to business operator terminal 12 (S310).

Next, business operator terminal 12 receives information X2 transmitted in step S310 (S311).

Next, business operator terminal 12 generates transaction data X2 including information X2 received in step S311 (S312).

Next, business operator terminal 12 transmits transaction data X2 including information X2, generated in step S312, to terminal A, for example (S313).

Next, terminal A receives transaction data X2 including information X2 transmitted in step S313 (S314).

Next, terminal A confirms information X2 included in transaction data X2 received in step S314, and verifies whether the existing contractor has consented to contract document X1 (S315). More specifically, terminal A verifies whether the existing contractor has consented to contract document X1 by confirming whether the confirmation result included in information X2 included in transaction data X2 received in step S314 indicates consent to contract document X1.

If it is confirmed in step S315 that the existing contractor does not consent to contract document X1 (NO in S315), terminal A notifies business operator terminal 12 and terminal X that the existing contractor has not consented to contract document X1 (S316). Through this, the business operator using business operator terminal 12 and user X using terminal X are notified that the existing contractor does not consent to contract document X1, and can therefore be prompted to reconsider the first contract, i.e., reconsider the contract content of contract document X1.

On the other hand, if in step S315 it is confirmed that the existing contractor consents to contract document X1 (YES in S315), terminal A sets contract document X1 in information X2 as a valid contract (S317). Here, terminal A sets contract document X1 in information X2 as a valid contract by including a flag indicating that the contract is valid in information X2 included in transaction data X2.

Next, terminal A notifies business operator terminal 12 and terminal X that contract document X1 in information X2 is valid (S318). Note that the timing at which terminal A makes the notification that contract document X1 is valid is not limited to the above case, and may be before step S317.

Next, terminal A forwards transaction data X2 to other terminals 20 and business operator terminal 12, i.e., terminal B, terminal C, terminal X, and business operator terminal 12 (S319).

Next, terminal A, terminal B, terminal C, terminal X, and business operator terminal 12 execute the consensus algorithm, generate a block including transaction data X2, and store the block in distributed ledger 128 and distributed ledger 217 (S320).

In this manner, the management system according to the present embodiment can cause an existing contractor to audit contract document X1 of a newly-formed contract. The management system according to the present embodiment then stores contract document X1 of the contract validated in response to a result of the audit in distributed ledger, within the transaction data.

The processing of step S306, i.e., the processing through which business operator terminal 12 is notified that contract document X1 in information X1 is valid, will be described in detail next with reference to FIG. 22.

Figure 22:
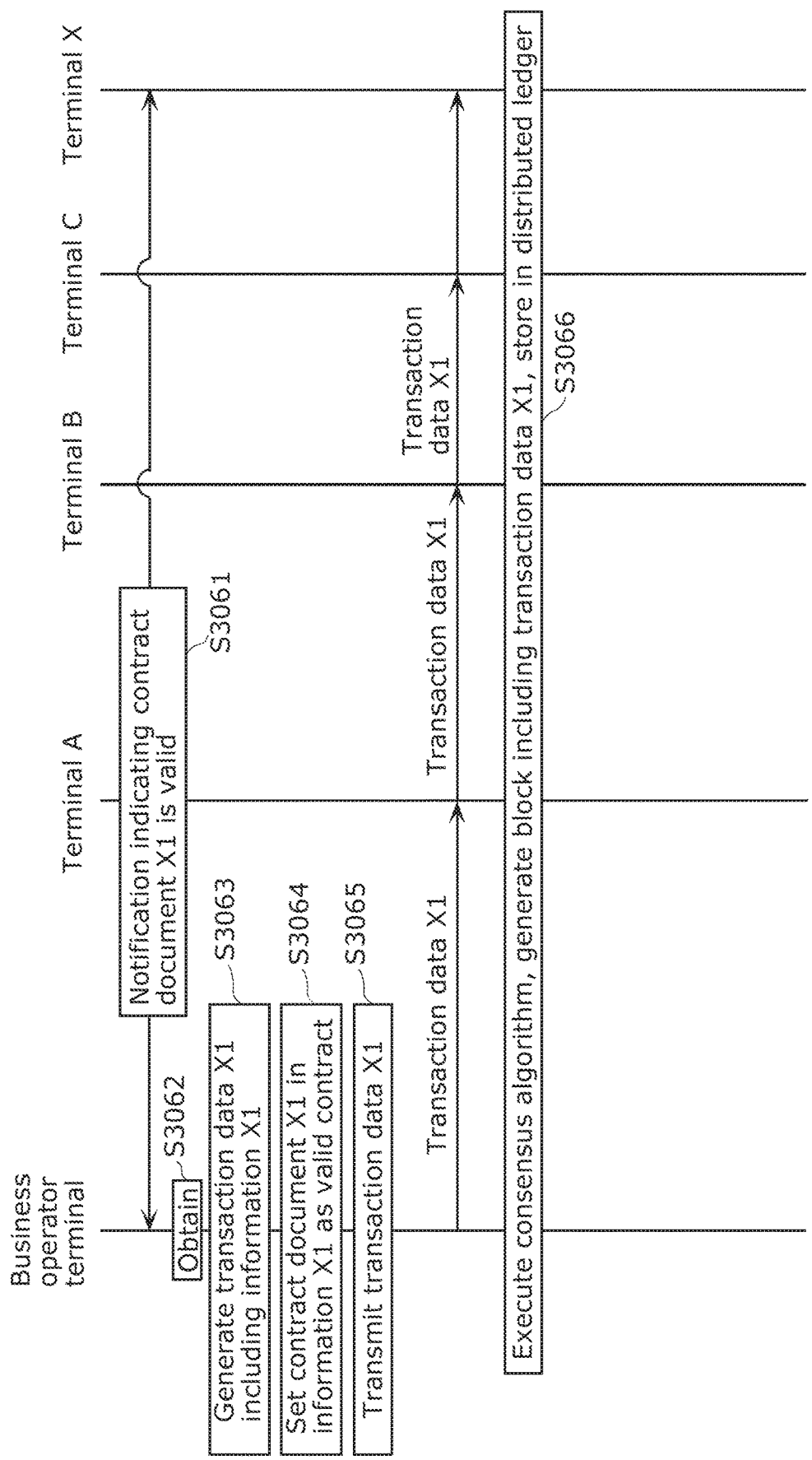
FIG. 22 is a sequence chart illustrating, in detail, the processing of step S306 in FIG. 20.

FIG. 22 is a sequence chart illustrating, in detail, the processing of step S306 in FIG. 20.

In the notification processing in step S306, first, terminal A notifies business operator terminal 12 and terminal X that contract document X1 is valid (S3061).

Next, business operator terminal 12 obtains the notification that contract document X1 is valid, made in step S3061 (S3062), and generates transaction data X1 including information X1 (S3063).

Next, business operator terminal 12 sets contract document X1 in information X1 as a valid contract by including a flag indicating that the contract is valid in information X1 (S3064).

Next, business operator terminal 12 transmits transaction data X1 including the flag indicating that the contract is valid in information X1 to, for example, all of terminals 21, i.e., terminal A, terminal B, terminal C, and terminal X (S3065).

Next, terminal A, terminal B, terminal C, terminal X, and business operator terminal 12 execute the consensus algorithm, generate a block including transaction data X1, and store the block in distributed ledger 128 and distributed ledger 217 (S3066).

Effects, Etc.

As described thus far, with the management system and the like according to Embodiment 3, an existing contractor be caused to audit a newly-formed contract, and furthermore, transaction data including information pertaining to a contract validated in response to a result of the audit can be stored in a distributed ledger.

Through this, a newly-formed contract can be audited, which makes it possible to suppress situations in which a business operator and a user collude on a contract. Additionally, the contract which has been audited and validated is stored in the distributed ledger, which makes it possible to prevent a newly-formed contract from being tampered with at a later date. Accordingly, situations where the business operator and the user collude on a contract can be suppressed more reliably.

Although the foregoing assumes that the existing contractor who audits the contract document of the newly-formed contract is a single person, the configuration is not limited thereto. As described in Embodiment 1, the number of existing contractors who perform the audit need only be one or more.

Variation 1

The foregoing Embodiment 3 described a case where one of the plurality of terminals 21, e.g., terminal A, identifies the existing contractor who audits the contract document of a newly-formed contract, verifies whether or not the identified existing contractor consents to the contract document, and the like, but the configuration is not limited thereto. An agent server may identify an existing contractor to audit the contract document of a newly-formed contract, and verify whether or not the identified existing contractor consents to the contract document.

The present variation will describe a case where the agent server identifies an existing contractor to audit the contract document of a newly-formed contract, and verifies whether or not the identified existing contractor has consented to the contract document. Furthermore, the present variation will describe a case where the agent server, the plurality of terminals 21, and business operator terminal 12 have a distributed ledger constituted by a plurality of ledgers having the same content. The following descriptions will focus upon the differences from Embodiment 1 and the like.

Management System

Figure 23:
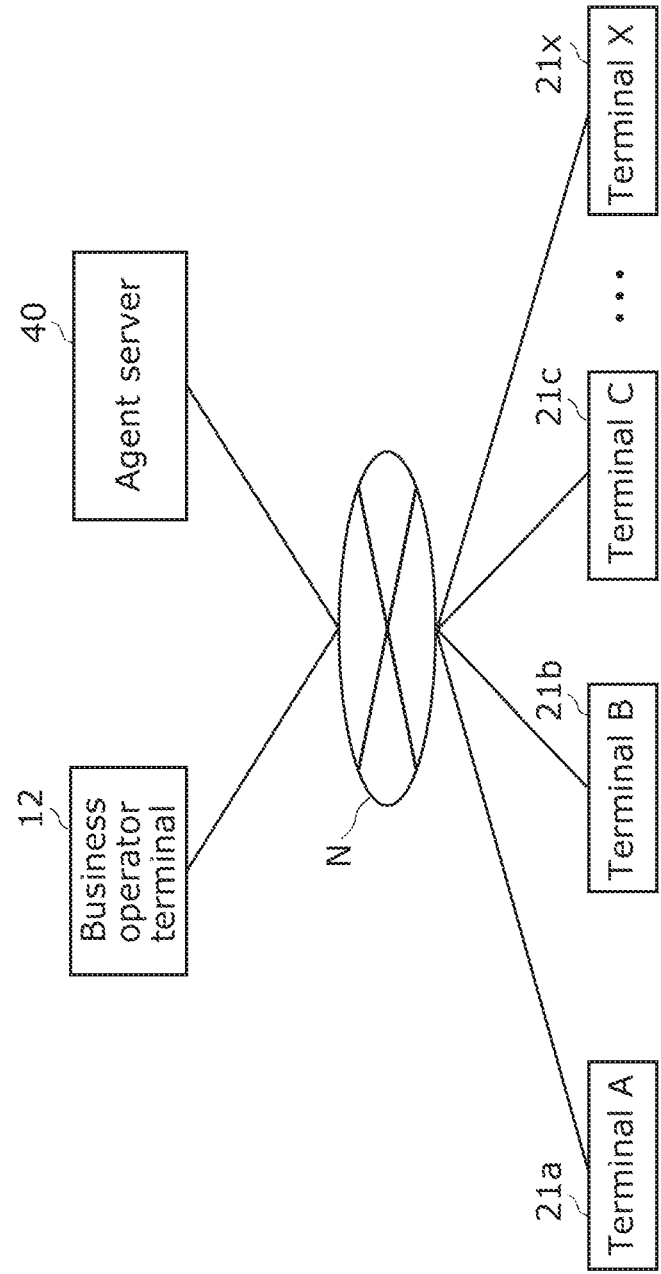
FIG. 23 is a diagram illustrating an example of the configuration of a management system according to Variation 1 on Embodiment 3.

FIG. 23 is a diagram illustrating an example of the configuration of a management system according to Variation 1 on Embodiment 3. Elements identical to those in FIG. 17 are given the same reference signs and will not be described in detail.

The management system illustrated in FIG. 23 differs from the management system according to Embodiment 3 in that agent server 40 is further included. Note that although each of terminal 21a to terminal 21x will also be called "terminal 21" hereinafter, terminal 21a to terminal 21x may also be referred to as "terminal A" to "terminal X".

Agent server 40 will be described hereinafter.

Agent Server 40

Agent server 40 is an example of a first server.

Figure 24:
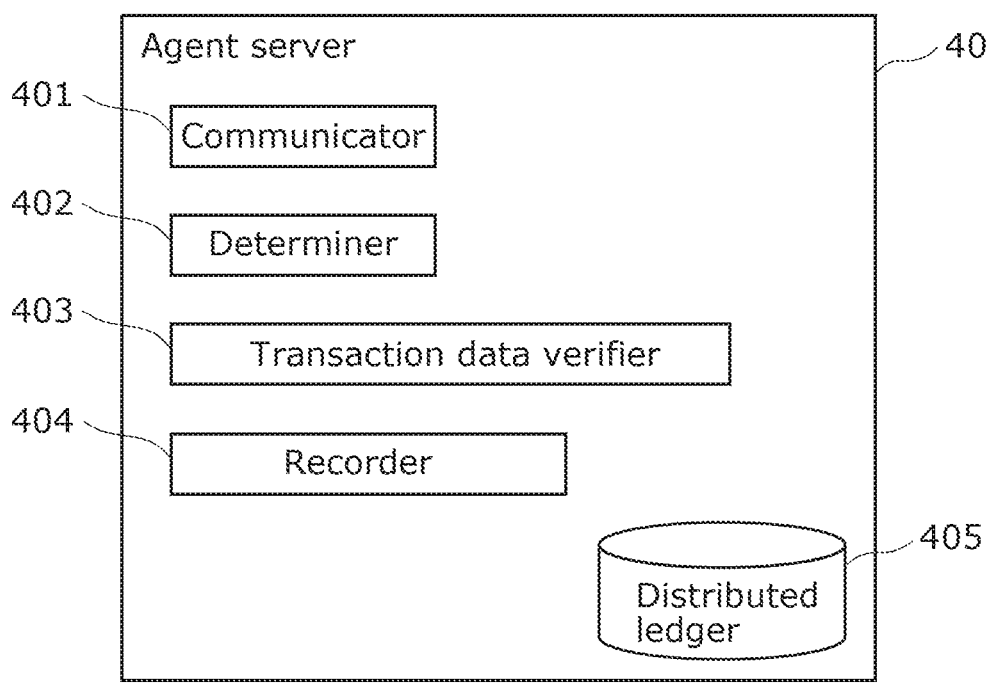
FIG. 24 is a diagram illustrating an example of the configuration of an agent server according to Variation 1 on Embodiment 3.

FIG. 24 is a diagram illustrating an example of the configuration of agent server 40 according to Variation 1 on Embodiment 3.

As illustrated in FIG. 24, agent server 40 includes communicator 401, determiner 402, transaction data verifier 403, recorder 404, and distributed ledger 405. Agent server 40 can be implemented by a processor executing a predetermined program using memory. Each constituent element will be described hereinafter.

Communicator 401

Communicator 401 receives the first information pertaining to the first contract from the first terminal used by the first user, who is one of the two parties who have agreed to the first contract. Communicator 401 transmits the first information to a second terminal used by the second user identified by determiner 402. Additionally, communicator 401 obtains the second information, in which the confirmation result indicating whether the second user consents or does not consent to the first contract and the digital signature of the second user is added to the first information. More specifically, communicator 401 obtains the second information by receiving the transaction data including that second information.

In the present embodiment, communicator 401 notifies business operator terminal 12 over network N that the existing contractor does not consent to contract document X1 or that contract document X1 is valid, transmits information X1 to terminal A among terminals 21, and the like. Additionally, communicator 401 receives information X1, receives transaction data X2 including information X2, and the like from business operator terminal 12. Note that communicator 401 receives transaction data X1 including information X1 from business operator terminal 12 upon making a notification that contract X1 of information X1 is valid because an audit by an existing contractor is not required in order to validate contract document X1.

In this manner, communicator 401 communicates with business operator terminal 12 or terminal 21 over network N. Note that this communication may be performed using TLS, and communicator 401 may hold an encryption key for TLS communication.

Transaction Data Verifier 403

When communicator 401 receives transaction data including the first information pertaining to the first contract or the second information, transaction data verifier 403 verifies the validity of the transaction data. For example, transaction data verifier 403 verifies whether the transaction data received by communicator 401 has been given a digital signature generated by a correct method. Note that this verification may be skipped.

Additionally, transaction data verifier 403 confirms the second information included in the transaction data received by communicator 401, and if the confirmation result included in the second information indicates consent to the first contract, the first contract is set as a valid contract. Here, transaction data verifier 403 may set the first contract as a valid contract by including a flag indicating that the first contract is a valid contract in the second information included in the transaction data. Additionally, transaction data verifier 403 sets the first contract in the first information as a valid contract by including a flag indicating that the contract in the first information included in the transaction data received by communicator 401 is valid.

Additionally, transaction data verifier 403, along with business operator terminal 12 and terminal 21, executes a consensus algorithm for agreeing on the validity of the transaction data. When the validity of the transaction data is confirmed, transaction data verifier 403 causes recorder 404 to record the transaction data.

In the present embodiment, transaction data verifier 403 verifies the validity of transaction data X1 including information X1 or transaction data X2 including information X2, received by communicator 401.

Additionally, transaction data verifier 403 confirms information X2 in transaction data X2 received by communicator 401, and if the confirmation result included in information X2 indicates consent to the first contract, the first contract is set as a valid contract. Here, transaction data verifier 403 sets the first contract as a valid contract by including a flag indicating that the first contract is a valid contract in information X2 included in transaction data X2.

Additionally, transaction data verifier 403 executes a consensus algorithm for agreeing on the validity of transaction data X1 or X2 including information X1 or information X2, which include the flag indicating that the first contract is a valid contract. When the validity of transaction data X2 is confirmed, transaction data verifier 403 causes recorder 404 to record that transaction data X1 or X2.

Recorder 404

By including the transaction data for which the validity has been verified by transaction data verifier 403 in blocks and recording the blocks into distributed ledger 405, recorder 404 records the transaction data.

Note that distributed ledger 405 may be configured within recorder 404.

Distributed Ledger 405

Distributed ledger 405 stores transaction data including information pertaining to past valid contracts. In the present embodiment, distributed ledger 405 stores contract document X1 of first contract which has been validated by transaction data verifier 403 storing transaction data X2 or X1, which include information X2 or information X1 including a flag indicating that the contract is valid.

Operations, Etc. of Management System

Operations of the management system configured as described above will be described next.

Figure 25:
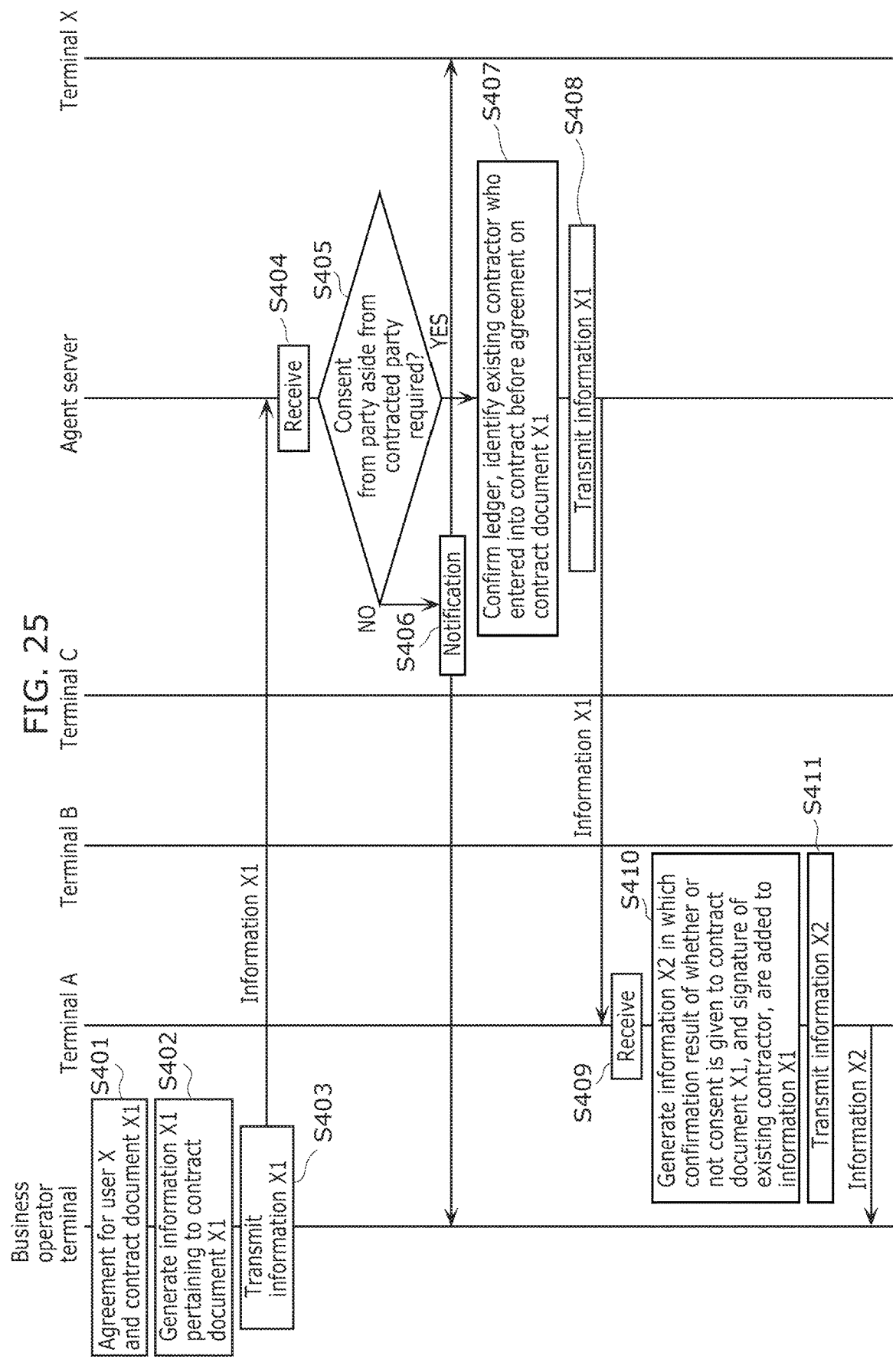
FIG. 25 is a sequence chart illustrating auditing processing by the management system according to Variation 1 on Embodiment 3.
Figure 26:
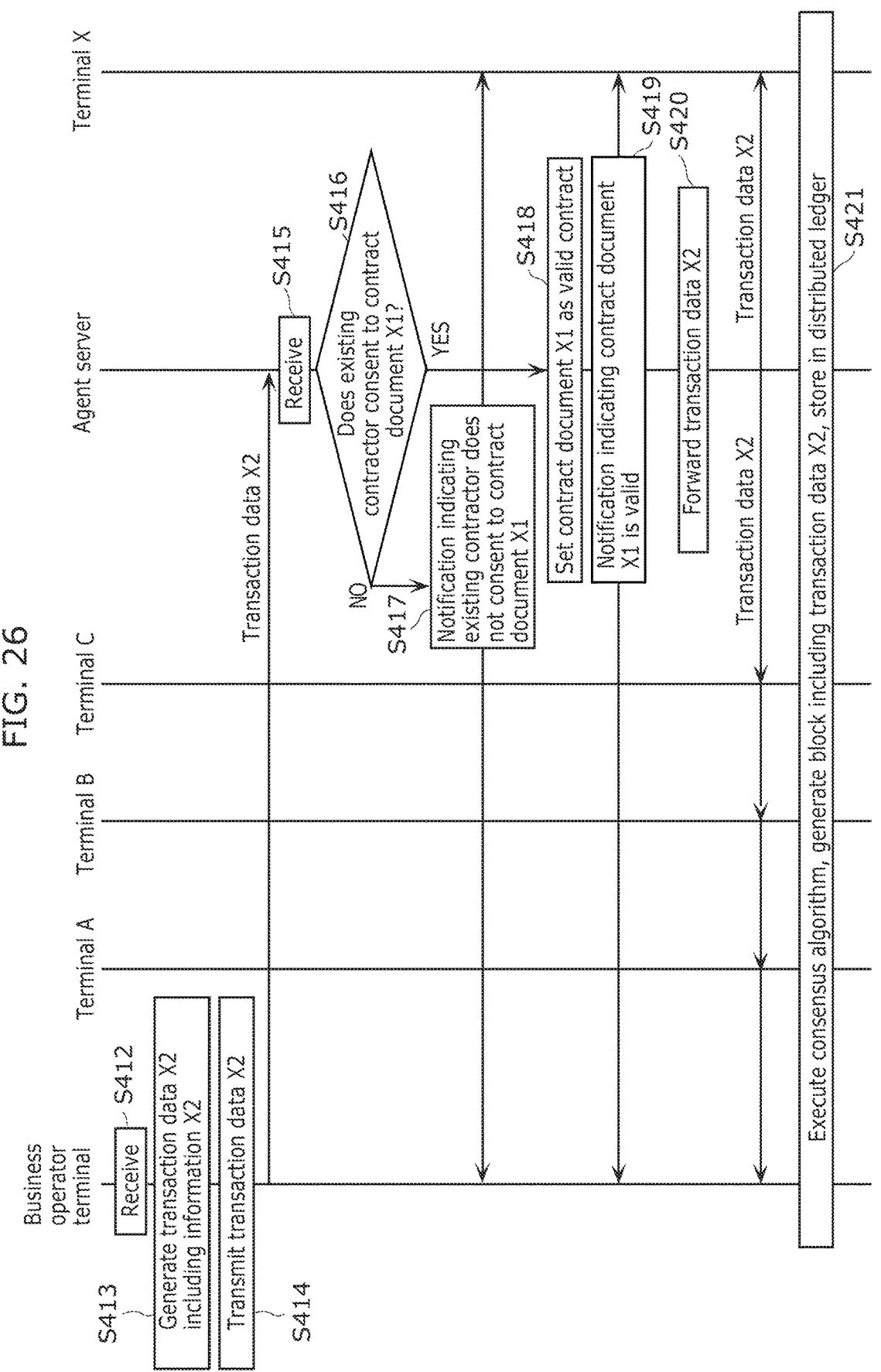
FIG. 26 is a sequence chart illustrating auditing processing by the management system according to Variation 1 on Embodiment 3.

FIGS. 25 and 26 are sequence charts illustrating auditing processing by the management system according to Variation 1 on Embodiment 3.

First, assume that the business operator using business operator terminal 12 has agreed to contract document X1 of the first contract with user X (S401). As described above, the business operator is an example of the first user, which is one party of the two parties who agreed to the first contract, and user X is an example of the third user, who is the other of the two parties. Contract document X1 is an example of the first contract and is data including the contract content of the first contract.

Next, business operator terminal 12 generates information X1 pertaining to contract document X1 in response to an operation by the business operator (S402).

Next, business operator terminal 12 transmits information X1 generated in step S402 to agent server 40 (S403).

Next, agent server 40 receives information X1 transmitted in step S403 (S404).

Next, agent server 40 determines whether or not the consent of a party aside from the contracted parties of contract document X1 indicated in information X, i.e., aside from user X and the business operator, is required (S405). More specifically, agent server 40 determines whether or not the consent of an existing contractor, i.e., an audit by the existing contractor, is required in order to validate contract document X1 indicated by information X.

If it is determined in step S405 that the first contract is an initial contract and consent of a party aside from the contracted parties is not required (NO in S405), agent server 40 notifies business operator terminal 12 and terminal X that contract document X1 in information X1 is valid (S406).

On the other hand, if it is determined in step S405 that the consent of a party aside from the contracted parties is required (YES in S405), agent server 40 confirms distributed ledger 405 and identifies an existing contractor who entered into the contract earlier in time than the agreement to contract document X1 (S407). In the present variation, agent server 40 identifies the user of terminal A as the second user, who is the existing contractor.

Next, agent server 40 transmits information X1 to terminal A, which is terminal 21 of the existing contractor identified (S408).

Next, terminal A receives information X1 transmitted in step S408 (S409).

Next, terminal A generates information X2, in which the confirmation result indicating whether or not there is consent to contract document X1 and the digital signature of the second user, who is the existing contractor, are added to information X1 (S410). As described above, information X2 is an example of the second information in which the confirmation result for the existing contractor and the digital signature of the existing contractor are added to the first information.

Next, terminal A transmits information X2 generated in step S410 to business operator terminal 12 (S411).

Next, business operator terminal 12 receives information X2 transmitted in step S411 (S412).

Next, business operator terminal 12 generates transaction data X2 including information X2 received in step S412 (S413).

Next, business operator terminal 12 transmits transaction data X2 including information X2, generated in step S413, to agent server 40 (S414).

Next, agent server 40 receives transaction data X2 including information X2 transmitted in step S414 (S415).

Next, agent server 40 confirms information X2 included in transaction data X2 received in step S415, and verifies whether the existing contractor has consented to contract document X1 (S416). More specifically, agent server 40 verifies whether the existing contractor has consented to contract document X1 by confirming whether the confirmation result included in information X2 included in transaction data X2 received in step S415 indicates consent to contract document X1.

If it is confirmed in step S416 that the existing contractor does not consent to contract document X1 (NO in S416), agent server 40 notifies business operator terminal 12 and terminal X that the existing contractor has not consented to contract document X1 (S417). Through this, the business operator using business operator terminal 12 and user X using terminal X are notified that the existing contractor does not consent to contract document X1, and can therefore be prompted to reconsider the first contract, i.e., reconsider the contract content of contract document X1.

On the other hand, if in step S416 it is confirmed that the existing contractor consents to contract document X1 (YES in S416), agent server 40 sets contract document X1 in information X2 as a valid contract (S418). Here, agent server 40 sets contract document X1 in information X2 as a valid contract by including a flag indicating that the contract is valid in information X2 included in transaction data X2.

Next, agent server 40 notifies business operator terminal 12 and terminal X that contract document X1 in information X2 is valid (S419). Note that the timing at which agent server 40 makes the notification that contract document X1 is valid is not limited to the above case, and may be before step S418.

Next, agent server 40 forwards transaction data X2 to terminals 21 and business operator terminal 12, i.e., terminal B, terminal C, terminal X, and business operator terminal 12 (S420).

Next, agent server 40, terminal A, terminal B, terminal C, terminal X, and business operator terminal 12 execute the consensus algorithm, generate a block including transaction data X2, and store the block in the respective distributed ledgers (S421).

In this manner, the management system according to the present embodiment can cause an existing contractor to audit contract document X1 of a newly-formed contract. The management system according to the present embodiment then stores contract document X1 of the contract validated in response to a result of the audit in distributed ledger, within the transaction data.

The processing of step S406, i.e., the processing through which business operator terminal 12 is notified that contract document X1 in information X1 is valid, will be described in detail next with reference to FIG. 27.

Figure 27:
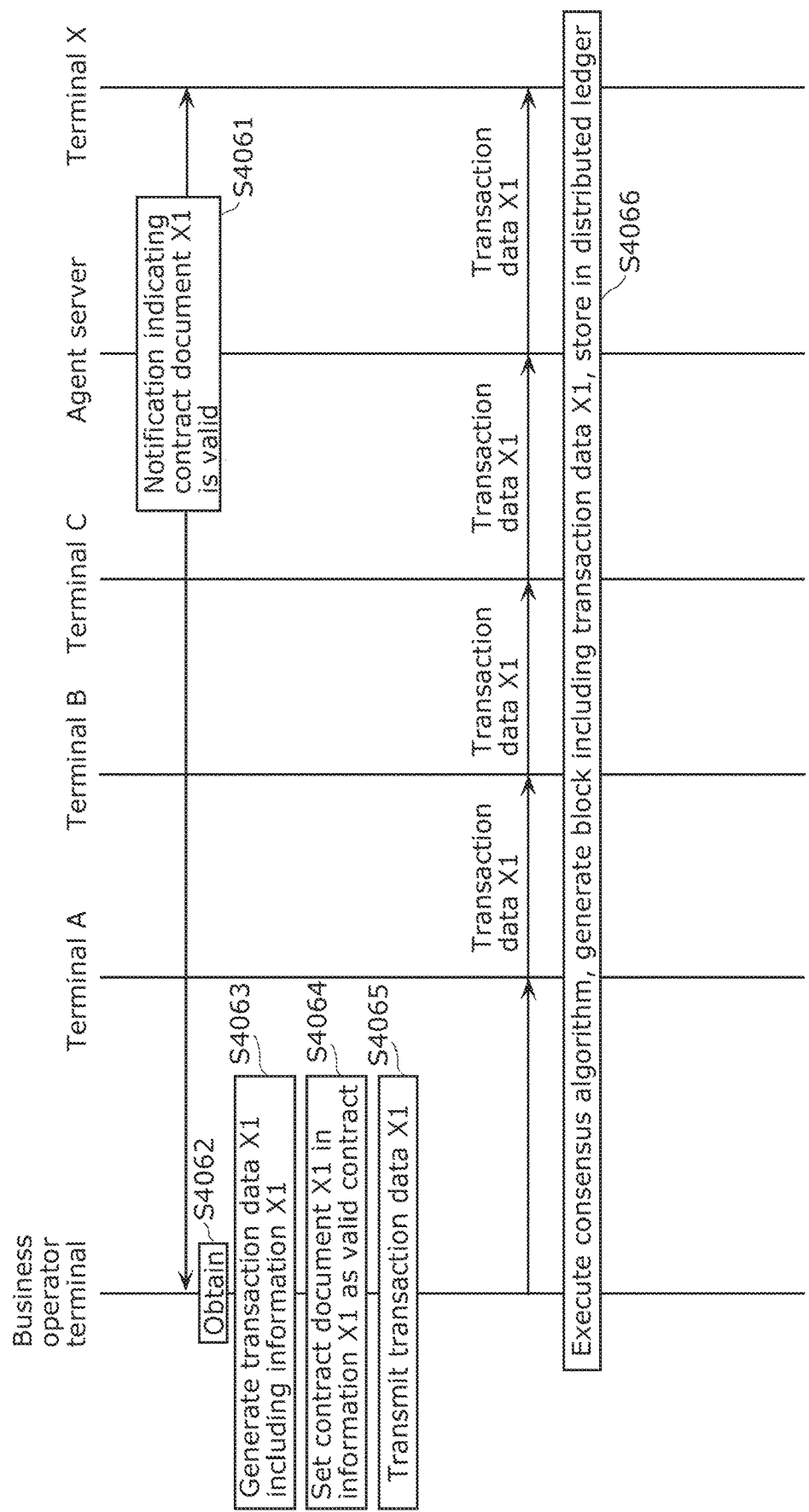
FIG. 27 is a sequence chart illustrating, in detail, the processing of step S406 in FIG. 25.

FIG. 27 is a sequence chart illustrating, in detail, the processing of step S406 in FIG. 25.

In the notification processing of step S406, first, agent server 40 notifies business operator terminal 12 and terminal X that contract document X1 in information X1 is valid (S4061).

Next, business operator terminal 12 obtains the notification that contract document X1 is valid, made in step S4061 (S4062), and generates transaction data X1 including information X1 (S4063).

Next, business operator terminal 12 sets contract document X1 in information X1 as a valid contract by including a flag indicating that the contract is valid in information X1 (S4064).

Next, business operator terminal 12 transmits transaction data X1 including the flag indicating that the contract is valid in information X1 to agent server 40 and terminals 21, i.e., agent server 40, terminal A, terminal B, terminal C, and terminal X (S4065).

Next, business operator terminal 12, agent server 40, terminal A, terminal B, terminal C, and terminal X execute the consensus algorithm, generate a block including transaction data X1, and store the block in the respective distributed ledgers (S4066).

Variation 2

The foregoing Variation 1 on Embodiment 3 describes a case where the agent server, the plurality of terminals 21, and business operator terminal 12 have a distributed ledger constituted by a plurality of ledgers having the same content, but the configuration is not limited thereto. The agent server and a plurality of authentication servers may have a distributed ledger constituted by a plurality of ledgers having the same content, and the plurality of terminals 21 and business operator terminal 12 may not have such a distributed ledger.

The present variation will describe a case where the agent server and the plurality of authentication servers have a distributed ledger constituted by a plurality of ledgers having the same content. Furthermore, the present variation will describe a case where the agent server identifies an existing contractor to audit the contract document of a newly-formed contract, and verifies whether or not the identified existing contractor has consented to the contract document. The following descriptions will focus upon the differences from Variation 1 and the like.

Management System

Figure 28:
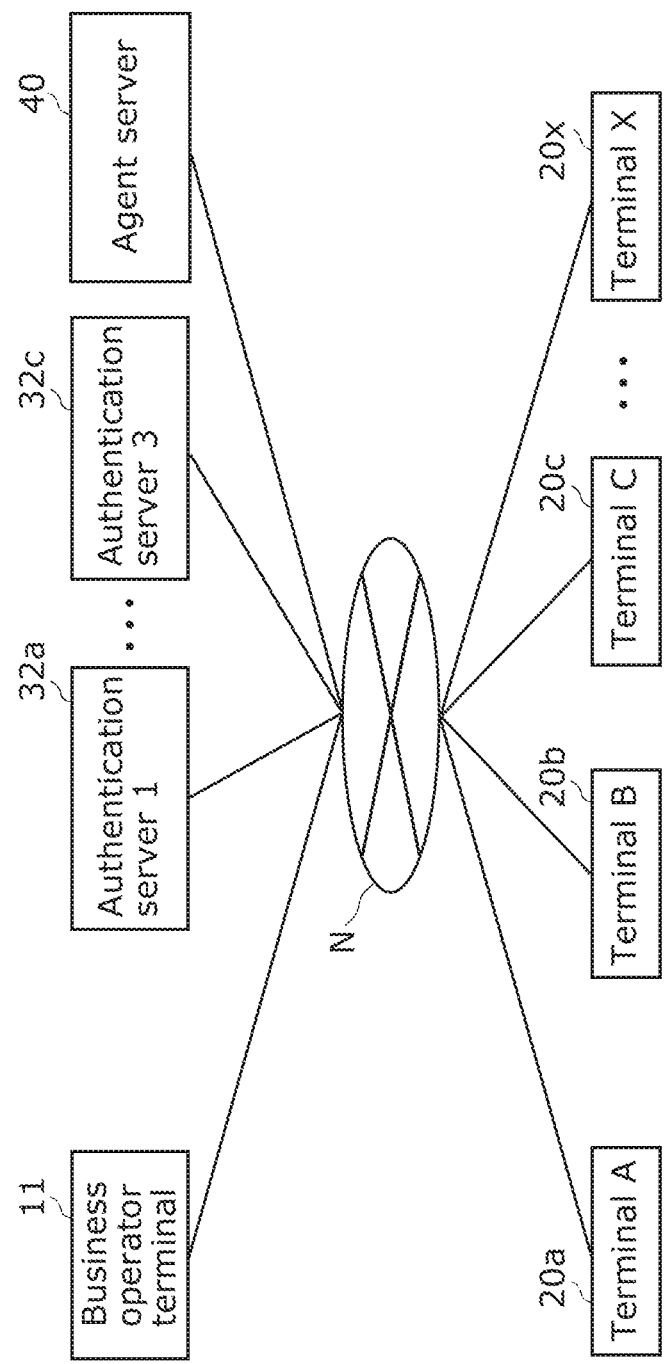
FIG. 28 is a diagram illustrating an example of the configuration of a management system according to Variation 2 on Embodiment 3.

FIG. 28 is a diagram illustrating an example of the configuration of a management system according to Variation 2 on Embodiment 3. Elements identical to those in FIGS. 9 and 23 are given the same reference signs and will not be described in detail.

The management system illustrated in FIG. 28 differs from the management system illustrated in FIG. 9 in that agent server 40 and authentication server 32a to authentication server 32c are further included. Note that agent server 40 illustrated in FIG. 28 is the same as that described in Variation 1 on Embodiment 3, and will therefore not be described here. Additionally, although each of terminal 21a to terminal 21x will also be called "terminal 21" hereinafter, terminal 21a to terminal 21x may also be referred to as "terminal A" to "terminal X". Likewise, although each of authentication server 32a to authentication server 32c will also be called "authentication server 32" hereinafter as well, authentication servers 32a to 32c may also be referred to as "authentication server 1" to "authentication server 3".

Authentication Server 32

Here, authentication server 32a to authentication server 32c have the same configuration, and will therefore be referred to as "authentication server 32".

Authentication server 32 is an example of a first server.

Figure 29:
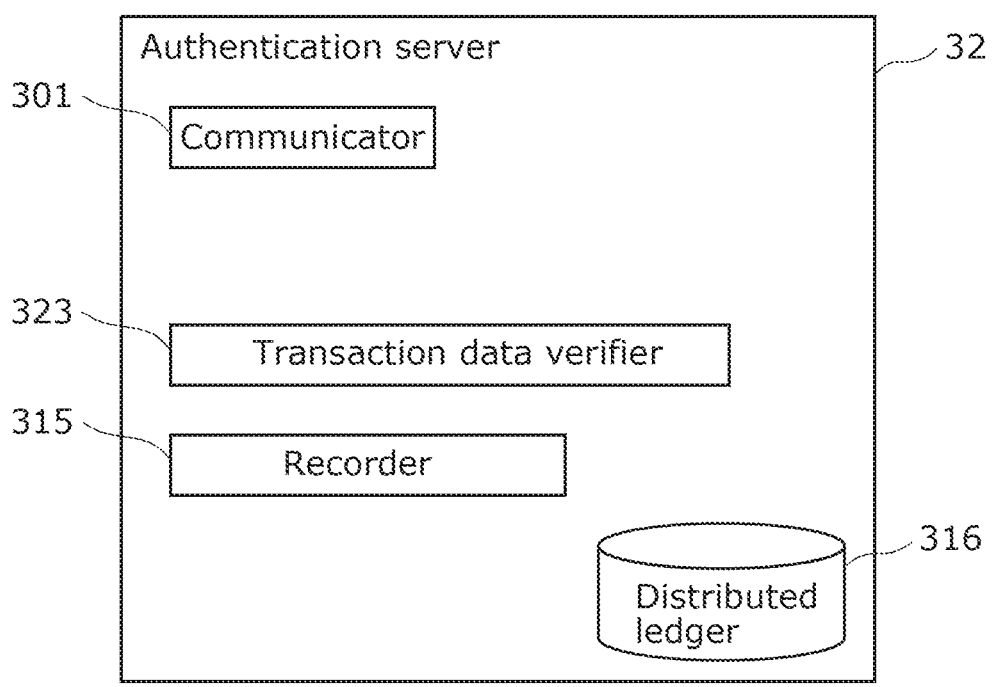
FIG. 29 is a diagram illustrating an example of the configuration of an authentication server according to Variation 2 on Embodiment 3.

FIG. 29 is a diagram illustrating an example of the configuration of authentication server 32 according to Variation 2 on Embodiment 3. Elements identical to those in FIG. 11 are given the same reference signs and will not be described in detail.

Authentication server 32 illustrated in FIG. 29 differs from authentication server 31 illustrated in FIG. 11 in that determiner 302 is not included, and the configuration of transaction data verifier 323 is different. Authentication server 32, too, can be implemented by a processor executing a predetermined program using memory.

Transaction Data Verifier 323

When communicator 301 receives transaction data including the first information pertaining to the first contract or the second information, transaction data verifier 323 verifies the validity of the transaction data. For example, transaction data verifier 323 verifies whether the transaction data received by communicator 301 has been given a digital signature generated by a correct method. Note that this verification may be skipped.

Additionally, transaction data verifier 323, along with agent server 40 and other authentication servers 32, executes a consensus algorithm for agreeing on the validity of the transaction data. When the validity of the transaction data is confirmed, transaction data verifier 323 causes recorder 315 to record the transaction data.

In the present embodiment, transaction data verifier 323 verifies the validity of transaction data X1 including information X1 or transaction data X2 including information X2, received by communicator 301.

Additionally, transaction data verifier 323 executes a consensus algorithm for agreeing on the validity of transaction data X1 or X2 including information X1 or information X2, which include the flag indicating that the first contract is a valid contract. When the validity of transaction data X2 is confirmed, transaction data verifier 323 causes recorder 315 to record that transaction data X1 or X2.

Operations, Etc. of Management System

Operations of the management system configured as described above will be described next.

Figure 30:
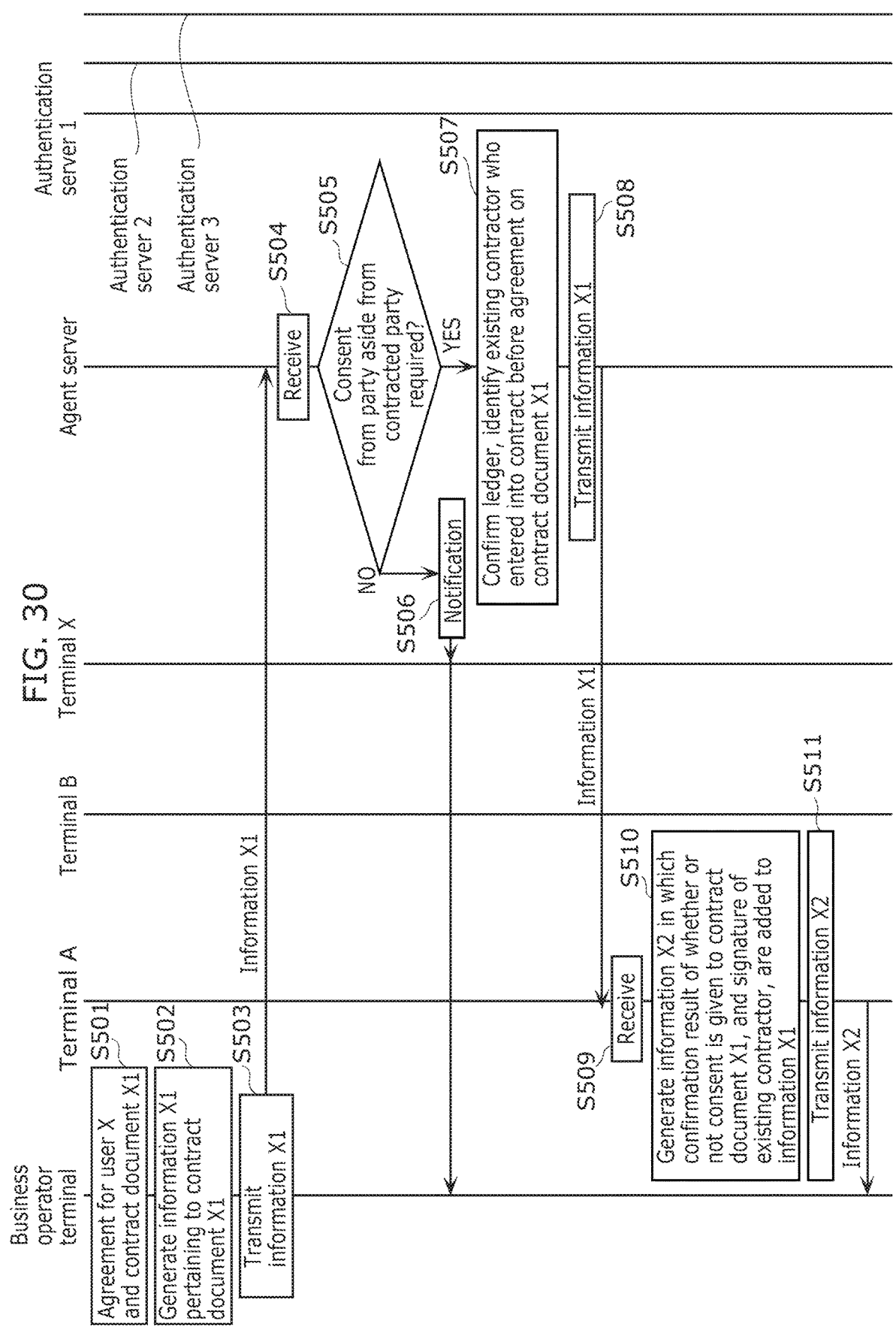
FIG. 30 is a sequence chart illustrating auditing processing by the management system according to Variation 2 on Embodiment 3.
Figure 31:
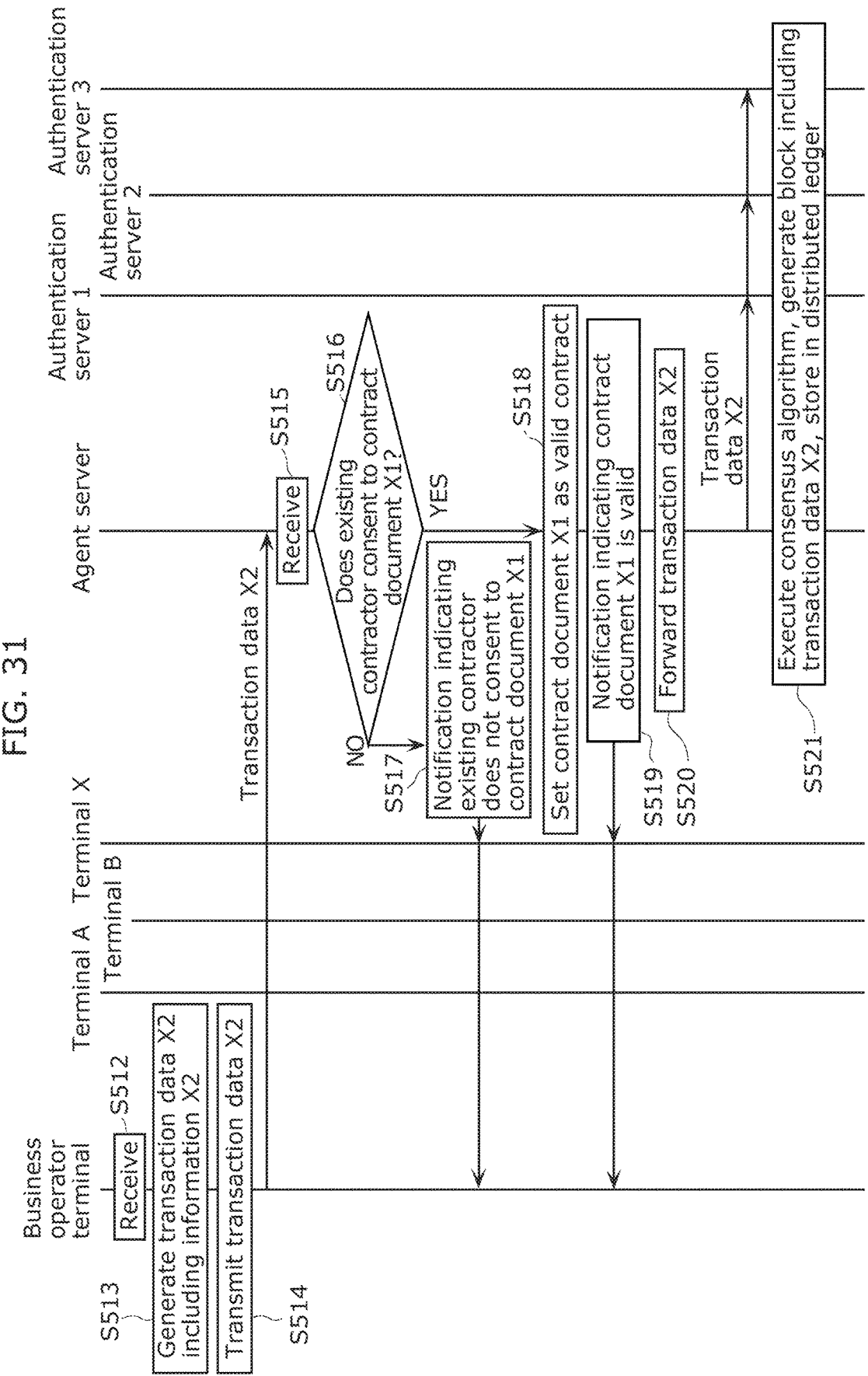
FIG. 31 is a sequence chart illustrating auditing processing by the management system according to Variation 2 on Embodiment 3.

FIGS. 30 and 31 are sequence charts illustrating auditing processing by the management system according to Variation 2 on Embodiment 3. Note that step S501 to step S519 illustrated in FIG. 30 and FIG. 31 perform the same processing as step S401 to step S419 in FIG. 25 and FIG. 26, and will therefore not be described.

In step S520, agent server 40 forwards transaction data X2 to the plurality of authentication servers 32, i.e., to authentication server 1, authentication server 2, and authentication server 3.

Next, agent server 40, authentication server 1, authentication server 2, and authentication server 3 execute the consensus algorithm, generate a block including transaction data X2, and store the block in the respectively distributed ledgers (S521).

In this manner, the management system according to the present embodiment can cause an existing contractor to audit contract document X1 of a newly-formed contract. The management system according to the present embodiment then stores contract document X1 of the contract validated in response to a result of the audit in distributed ledger, within the transaction data.

The processing of step S506, i.e., the processing through which business operator terminal 12 is notified that contract document X1 in information X1 is valid, will be described in detail next with reference to FIG. 32.

Figure 32:
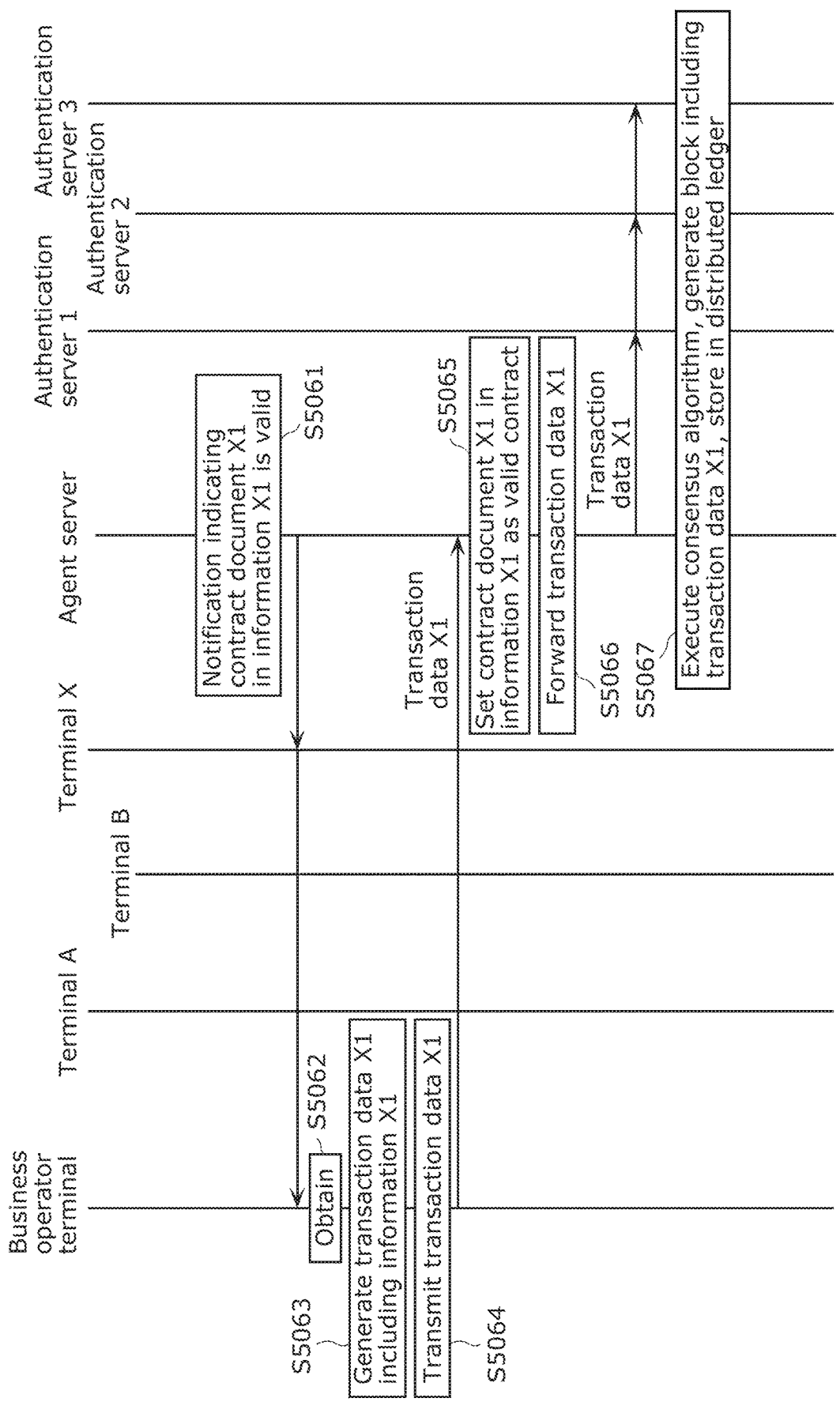
FIG. 32 is a sequence chart illustrating, in detail, the processing of step S506 in FIG. 30.

FIG. 32 is a sequence chart illustrating, in detail, the processing of step S506 in FIG. 30. Note that step S5061 to step S5063 illustrated in FIG. 32 perform the same processing as step S4061 to step S4063 in FIG. 27, and will therefore not be described.

In step S5064, business operator terminal 12 transmits transaction data X1 including information X1, generated in step S5063, to agent server 40.

Next, upon receiving transaction data X1 including information X1, agent server 40 sets contract document X1 in information X1 as a valid contract by including a flag indicating that the contract is valid in information X1 (S5065).

Next, agent server 40 forwards transaction data X2, which includes the flag indicating that the contract is valid in information X1, to the plurality of authentication servers 32, i.e., to authentication server 1, authentication server 2, and authentication server 3 (S5066).

Next, agent server 40, authentication server 1, authentication server 2, and authentication server 3 execute the consensus algorithm, generate a block including transaction data X1, and store the block in the respectively distributed ledgers (S5067).

Other Embodiments

Although the present disclosure has been described above based on the aforementioned embodiments, the present disclosure is of course not limited to the embodiments discussed above. The present disclosure is also inclusive of the following cases.

(1) For example, in the present disclosure, whether the first contract in the first information has been tampered with or the like may be confirmed by using a terminal used by the identified existing contractor to confirm the content of the first information, such as information X generated by the business operator terminal.

(2) Although the foregoing embodiments described the authentication servers, the agent server, and the like as identifying the existing contractor who audits the contract document of the newly-formed contract, the configuration is not limited thereto. The authentication servers, the agent server, and the like may further be equipped with artificial intelligence (AI). In this case, the authentication servers, the agent server, and the like may cause the AI to compare the contract document of the newly-formed contract with the contract document of the existing contractor and determine whether the contract document of the existing contractor has contract content which is less favorable than the contract document of the newly-formed contract.

(3) Each device in the foregoing embodiments is specifically a computer system constituted by a microprocessor, ROM, RAM, a hard disk unit, a display unit, a keyboard, a mouse, and the like. A computer program is recorded in the RAM or hard disk unit. Each device realizes the functions thereof by the microprocessor operating in accordance with the computer program. Here, the computer program is constituted by a combination of a plurality of command codes that indicate commands made to a computer to achieve a predetermined function.

(4) Some or all of the constituent elements constituting the devices in the foregoing embodiments may be implemented by a single integrated circuit through system LSI (Large-Scale Integration). "System LSI" refers to very-large-scale integration in which multiple constituent elements are integrated on a single chip, and specifically, refers to a computer system configured including a microprocessor, ROM, RAM, and the like. A computer program is recorded in the RAM. The system LSI circuit realizes the functions thereof by the microprocessor operating in accordance with the computer program.

The parts of the constituent elements constituting the foregoing devices may be implemented individually as single chips, or may be implemented with a single chip including some or all of the devices.

Although the term "system LSI" is used here, other names, such as IC, LSI, super LSI, ultra LSI, and so on may be used, depending on the level of integration. Furthermore, the manner in which the circuit integration is achieved is not limited to LSI, and it is also possible to use a dedicated circuit or a generic processor. An FPGA (Field Programmable Gate Array) capable of post-production programming or a reconfigurable processor in which the connections and settings of the circuit cells within the LSI can be reconfigured may be used as well.

Furthermore, if other technologies that improve upon or are derived from semiconductor technology enable integration technology to replace LSI circuits, then naturally it is also possible to integrate the function blocks using that technology. Biotechnology applications are one such foreseeable example.

(5) Some or all of the constituent elements constituting the foregoing devices may be constituted by IC cards or stand-alone modules that can be removed from and mounted in the apparatus. The IC card or the module is a computer system constituted by a microprocessor, ROM, RAM, and the like. The IC card or module may include the above very-large-scale integration LSI circuit. The IC card or module realizes the functions thereof by the microprocessor operating in accordance with the computer program. The IC card or module may be tamper-resistant.

(6) The present disclosure may be realized by the methods described above. This may be a computer program that implements these methods on a computer, or a digital signal constituting the computer program.

Additionally, the present disclosure may also be computer programs or digital signals recorded in a computer-readable recording medium such as a flexible disk, a hard disk, a CD-ROM, an MO, a DVD, a DVD-ROM, a DVD-RAM, a BD (Blu-ray (registered trademark) Disc), semiconductor memory, or the like. The constituent elements may also be the digital signals recorded in such a recording medium.

Additionally, the present disclosure may be realized by transmitting the computer program or digital signal via a telecommunication line, a wireless or wired communication line, a network such as the Internet, a data broadcast, or the like.

The present disclosure may also be a computer system including a microprocessor and memory, where the memory stores the above-described computer program and the microprocessor operates in accordance with the computer program.

The present disclosure may also be implemented by another independent computer system, by recording the program or the digital signal in the recording medium and transferring the recording medium, or by transferring the program or the digital signal over the network or the like.

(7) The above-described embodiments and variations may be combined as well.

INDUSTRIAL APPLICABILITY

The present disclosure can be used in a control method, a server, and a recording medium, and can be used in a control method, a server, a recording medium, and the like that cause an existing contractor to audit a newly-formed individual contract when a business operator and a user enter into the individual contract for a vehicle sharing service, for example.

The invention claimed is:

1. A control method executed by a first server among at least one server in a system, the system including at least three terminals used by corresponding users and the at least one server, the control method comprising:
receiving first information pertaining to a first contract from a first terminal used by a first user among the at least three terminals, the first user being one of two parties who have agreed to the first contract;

when consent of a party aside from the two parties is determined to be required to validate the first contract, identifying a second user as the party aside from the two parties with reference to a ledger storing information pertaining to a past contract, and transmitting the first information to a second terminal among the at least three terminals operated by the second user identified;

obtaining second information in which a confirmation result indicating whether the second user consents or does not consent to the first contract and a digital signature of the second user are added to the first information; and confirming the second information, and when the confirmation result indicates consent to the first contract, setting the first contract as a valid contract and storing the second information in which the first contract is set as a valid contract in the ledger, wherein the first information includes:

data indicating contract content of the first contract;

an identifier (ID) indicating a third user, the third user being another of the two parties who have agreed to the first contract; and an ID indicating a generator of the first information.

2. The control method according to claim 1,
wherein when identifying the second user,
a party who is another of two parties who have agreed to a second contract agreed to and validated earlier in time than the first contract, and is a party different from the first user, is identified as the second user.

3. The control method according to claim 1,
wherein when setting the first contract as a valid contract,
a flag indicating that the first contract is a valid contract is included in the second information.

4. The control method according to claim 1,
wherein the ledger is a distributed ledger in which a plurality of ledgers having identical content are built on blockchain infrastructure.

5. The control method according to claim 4,
wherein when obtaining the second information,
the second information is obtained by receiving transaction data including the second information, and
when storing the second information, in which the first contract is set as a valid contract, in the ledger,
a block including the transaction data is stored in the distributed ledger.

6. The control method according to claim 5,
wherein when storing a block including the transaction data in the ledger,
a consensus algorithm for agreeing on a validity of the transaction data is executed along with a plurality of second servers aside from the first server among the at least one server, and
a block including the transaction data is stored in the distributed ledger when the validity of the transaction data has been agreed on through the consensus algorithm.

7. The control method according to claim 5,
wherein each of the at least three terminals has the ledger, and
when storing a block including the transaction data in the ledger,
a consensus algorithm for agreeing on a validity of the transaction data is executed along with the at least three terminals, and a block including the transaction data is stored in the ledger when the validity of the transaction data has been agreed on through the consensus algorithm.

8. The control method according to claim 5,
wherein when storing a block including the transaction data in the ledger,
the transaction data is stored in the ledger as blockchain transaction data.

9. A server among at least one server in a system, the system including at least three terminals used by corresponding users and the at least one server, the server comprising:

a processor; and memory, wherein the processor receives first information pertaining to a first contract from a first terminal used by a first user among the at least three terminals, the first user being one of two parties who have agreed to the first contract;

when consent of a party aside from the two parties is determined to be required to validate the first contract, the processor identifies a second user as the party aside from the two parties with reference to a ledger storing information pertaining to a past contract, and transmits the first information to a second terminal among the at least three terminals operated by the second user identified;

the processor obtains second information in which a confirmation result indicating whether the second user consents or does not consent to the first contract and a digital signature of the second user are added to the first information; and the processor confirms the second information, and when the confirmation result indicates consent to the first contract, sets the first contract as a valid contract and stores the second information in which the first contract is set as a valid contract in the ledger, wherein the first information includes:

data indicating contract content of the first contract;

an identifier (ID) indicating a third user, the third user being another of the two parties who have agreed to the first contract; and an ID indicating a generator of the first information.

10. A non-transitory computer-readable recording medium having recorded thereon a computer program for causing a computer to execute a control method executed by a first server among at least one server in a system, the system including at least three terminals used by corresponding users and the at least one server, the control method comprising:

receiving first information pertaining to a first contract from a first terminal used by a first user among the at least three terminals, the first user being one of two parties who have agreed to the first contract;

when consent of a party aside from the two parties is determined to be required to validate the first contract, identifying a second user as the party aside from the two parties with reference to a ledger storing information pertaining to a past contract, and transmitting the first information to a second terminal among the at least three terminals operated by the second user identified;

obtaining second information in which a confirmation result indicating whether the second user consents or does not consent to the first contract and a digital signature of the second user are added to the first information; and confirming the second information, and when the confirmation result indicates consent to the first contract, setting the first contract as a valid contract and storing the second information in which the first contract is set as a valid contract in the ledger, wherein the first information includes:

data indicating contract content of the first contract;

an identifier (ID) indicating a third user, the third user being another of the two parties who have agreed to the first contract; and an ID indicating a generator of the first information.

* * * * *